United States Patent
Hirono et al.

(10) Patent No.: US 9,523,818 B2
(45) Date of Patent: Dec. 20, 2016

(54) OPTICAL FIBER AND MANUFACTURING METHOD THEREOF

(75) Inventors: Satoshi Hirono, Shiga (JP); Naoto Inoue, Shiga (JP); Manabu Ikoma, Kyoto (JP); Kiyohiko Gondo, Kyoto (JP); Tsuyoshi Miyata, Kyoto (JP); Kazunari Komai, Stuttgart (DE)

(73) Assignee: OMRON Corporation, Kyoto (JP)

( * ) Notice: Subject to any disclaimer, the term of this patent is extended or adjusted under 35 U.S.C. 154(b) by 492 days.

(21) Appl. No.: 14/003,561

(22) PCT Filed: Mar. 22, 2011

(86) PCT No.: PCT/JP2011/056785
§ 371 (c)(1),
(2), (4) Date: Oct. 2, 2013

(87) PCT Pub. No.: WO2012/124148
PCT Pub. Date: Sep. 20, 2012

(65) Prior Publication Data
US 2014/0056558 A1    Feb. 27, 2014

(30) Foreign Application Priority Data
Mar. 15, 2011    (JP) .................................. 2011-056832

(51) Int. Cl.
| G02B 6/32 | (2006.01) |
| G02B 6/26 | (2006.01) |
| G02B 6/02 | (2006.01) |
| G02B 6/032 | (2006.01) |
(Continued)

(52) U.S. Cl.
CPC ............. *G02B 6/262* (2013.01); *B23K 26/386* (2013.01); *G02B 6/02052* (2013.01); *G02B 6/02123* (2013.01); *G02B 6/032* (2013.01); *G02B 6/25* (2013.01); *G02B 6/02061* (2013.01)

(58) Field of Classification Search
None
See application file for complete search history.

(56) References Cited

U.S. PATENT DOCUMENTS

| 5,274,721 A | 12/1993 | Dickinson et al. |
| 5,373,571 A | 12/1994 | Reid et al. |
(Continued)

FOREIGN PATENT DOCUMENTS

| CN | 101564947 A | 10/2009 |
| EP | 1544644 A1 | 6/2005 |
(Continued)

OTHER PUBLICATIONS

Office Action issued in corresponding Chinese Application No. 201180069241.6, mailed on May 28, 2015 (12 pages).
(Continued)

*Primary Examiner* — Uyen Chau N Le
*Assistant Examiner* — Chad Smith
(74) *Attorney, Agent, or Firm* — Osha Liang LLP

(57) ABSTRACT

An optical fiber has an incident end on which light is incident, an emitting end from which the light is emitted, and an aperture provided in a core located at or near the emitting end. The aperture is formed by irradiating the core with an ultrashort pulsed laser beam having pulse widths of $10^{-15}$ seconds to $10^{-11}$ seconds.

20 Claims, 21 Drawing Sheets

(51) Int. Cl.
    *G02B 6/25*    (2006.01)
    *B23K 26/38*   (2014.01)

(56) References Cited

U.S. PATENT DOCUMENTS

| | | | |
|---|---|---|---|
| 2002/0076131 A1* | 6/2002 | Mohtat | G02B 6/29355 |
| | | | 385/14 |
| 2004/0112877 A1 | 6/2004 | Smithson et al. | |
| 2005/0135772 A1 | 6/2005 | Nield et al. | |
| 2005/0244123 A1 | 11/2005 | Hirao et al. | |
| 2006/0093265 A1* | 5/2006 | Jia | B23K 26/03 |
| | | | 385/37 |
| 2006/0215976 A1* | 9/2006 | Singh | G02B 6/02042 |
| | | | 385/126 |
| 2006/0219676 A1* | 10/2006 | Taylor | B82Y 20/00 |
| | | | 219/121.69 |
| 2007/0274629 A1 | 11/2007 | Kirkpatrick et al. | |

FOREIGN PATENT DOCUMENTS

| | | | |
|---|---|---|---|
| JP | H06-174969 A | 6/1994 |
| JP | 2002182045 A | 6/2002 |
| JP | 2004138720 A | 5/2004 |
| JP | 2005292382 A | 10/2005 |
| JP | 2006510057 A | 3/2006 |
| WO | 2004013668 A2 | 2/2004 |

OTHER PUBLICATIONS

International Search Report issued in International Application No. PCT/JP2011/056785; Mailed May 17, 2011 (4 pages).
Extended European Search Report for Application No. 11860920.5, mailed on Aug. 25, 2014 (9 pages).

* cited by examiner

OPTICAL FIBER AND MANUFACTURING METHOD THEREOF

BACKGROUND

Technical Field

The present invention relates to an optical fiber and a manufacturing method thereof, particularly to an optical fiber in which a beam control property of light emitting from an emitting end and a manufacturing method thereof.

Related Art

The optical fiber is a light guide member, in which the light incident at an incident end from a light source propagates and emits outward from the emitting end. The optical fiber includes a core that is of a core wire, a clad that covers an outside of the core, and a coating material that covers the outside of the clad. The optical fiber is configured such that the light propagates in the core by reflecting the light at an interface between the core and the clad using a difference in refractive index between the core and the clad.

Usually, an additional external optical system typified by various lenses is frequently connected to the emitting end of the optical fiber. Therefore, the external optical system performs beam control of the light emitting from the emitting end of the optical fiber.

There is also a proposal in which various lenses are directly formed by performing laser processing to the emitting end of the optical fiber or near the emitting end, thereby performing the beam control of the light emitting from the optical fiber.

For example, in the configuration of the optical fiber disclosed in Japanese Unexamined Patent Application Publication No. 2006-510057 (Translation of PCT Application) (Patent Document 1), surface removal processing is performed to form the lens by irradiating the emitting end with a laser beam, and the lens performs the beam control of the light emitting from the optical fiber. In the configuration of the optical fiber disclosed in Japanese Unexamined Patent Publication No. 2005-292382 (Patent Document 2), a refractive index change is induced to form the lens by irradiating the vicinity of the emitting end, and the lens performs the beam control of the light emitting from the optical fiber.

Patent Document 1: Japanese Unexamined Patent Application Publication No. 2006-510057 (Translation of PCT Application)

Patent Document 2: Japanese Unexamined Patent Publication No. 2005-292382

SUMMARY

However, in the case that the beam control of the light emitting from the optical fiber is performed using the external optical system, because the light emitting from the emitting end of the optical fiber includes light having a wide emitting angle corresponding to a numerical aperture of the optical fiber, unfortunately it is necessary to use the external optical system having an effective diameter extremely larger than a core diameter of the optical fiber. In view of the above, the external optical system may include an aperture. However, in this case, unfortunately the number of components of the external optical system increases, or it may be necessary to accurately perform positioning between the external optical system including the aperture and the optical fiber.

On the other hand, in the case that the optical fibers disclosed in Patent Documents 1 and 2 are used, although the number of components of the external optical system can advantageously decrease, a thing that acts as an opening restriction to the light incident to the lens formed by the laser processing does not exist (that is, a thing that exerts an aperture function). Therefore, the beam control has low controllability, and the beam control can desirably be performed to only part of the light incident to the lens, which may result in a signal-to-noise ratio (an S/N ratio) of the light emitting from the optical fiber being significantly degraded.

One or more embodiments of the present invention provides an optical fiber, in which the beam control property of the light emitting from the emitting end is enhanced by adding the aperture function, and a manufacturing method thereof.

In accordance with one or more embodiments of the present invention, an optical fiber includes: an incident end to which light is incident; and an emitting end from which the light emits. Herein, an aperture is provided in a core located at and/or near the emitting end, the aperture being formed by irradiating the core with an ultrashort pulsed laser beam having pulse widths of $10^{-15}$ seconds to $10^{-11}$ seconds.

In the optical fiber according to one or more embodiments of the present invention, the aperture includes a light scattering region, the light scattering region being formed by inducing a damage change in part of the core through the irradiation of the ultrashort pulsed laser beam.

In the optical fiber according to one or more embodiments of the present invention, the aperture includes a light absorption region, the light absorption region being formed by inducing blackening in part of the core through the irradiation of the ultrashort pulsed laser beam.

In the optical fiber according to one or more embodiments of the present invention, the aperture has a disc shape, the aperture including an opening in a center thereof so as to surround an axis line of the core.

In the optical fiber according to one or more embodiments of the present invention, the plural apertures are provided along the axis line of the core while separated from each other.

In the optical fiber according to one or more embodiments of the present invention, the aperture has a cylindrical shape, the aperture including a hollow portion so as to surround the axis line of the core.

In the optical fiber according to one or more embodiments of the present invention, the plural apertures are provided along a direction orthogonal to the axis line of the core while separated from each other.

In the optical fiber according to one or more embodiments of the present invention, an optical element is provided on the emitting end side of a position where the aperture is formed.

In the optical fiber according to one or more embodiments of the present invention, the optical element is formed by irradiating the core with the ultrashort pulsed laser beam having pulse widths of $10^{-15}$ seconds to $10^{-11}$ seconds.

In the optical fiber according to one or more embodiments of the present invention, the optical element is a lens.

In the optical fiber according to one or more embodiments of the present invention, the optical element is a volume diffractive optical element.

In the optical fiber according to one or more embodiments of the present invention, the aperture includes a volume diffractive optical element, the volume diffractive optical element being formed by inducing a refractive index change in part of the core through the irradiation of the ultrashort pulsed laser beam.

In accordance with one or more embodiments of the present invention, in a method for manufacturing the optical fiber, the aperture is formed in the core located at and/or near the emitting end by irradiating the core with the ultrashort pulsed laser beam from the emitting end side.

Accordingly, one or more embodiments of the present invention can provide the optical fiber, in which the beam control property of the light emitting from the emitting end is enhanced by adding the aperture function, and the manufacturing method thereof.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. In the following embodiments, the equivalent or common portion is designated by the identical numeral, and the overlapping description is omitted.

First Embodiment

Figure 1:
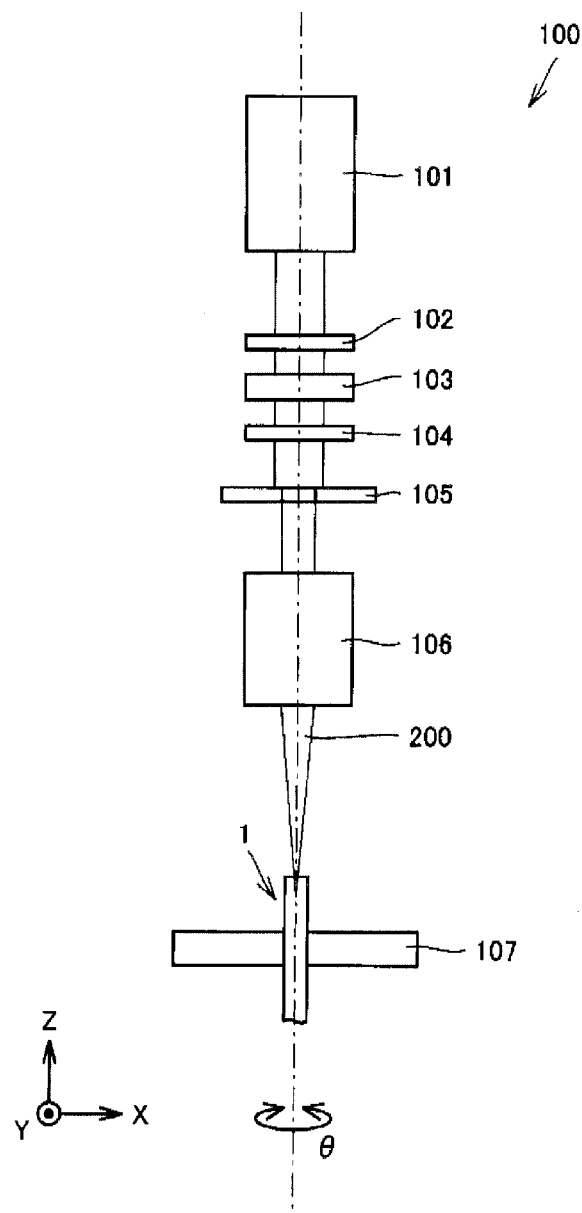
FIG. 1 is a view illustrating a configuration of a manufacturing apparatus that performs an optical fiber manufacturing method according to a first embodiment of the present invention.

FIG. 1 is a view illustrating a configuration of a manufacturing apparatus that performs an optical fiber manufacturing method according to a first embodiment of the present invention. The optical fiber manufacturing method of the first embodiment will be described with reference to FIG. 1.

As illustrated in FIG. 1, a manufacturing apparatus 100 that performs the optical fiber manufacturing method of the first embodiment is a laser machining apparatus that processes an aperture in an optical fiber 1 of a workpiece in which the aperture is not formed yet using an ultrashort pulsed laser beam (hereinafter also referred to as a femtosecond laser beam) having a pulse widths of $10^{-15}$ seconds (1 femtosecond) to $10^{-11}$ seconds (10 picoseconds). The manufacturing apparatus 100 mainly includes a laser source 101, optical systems 102 to 106 that are added to the laser source 101, and a holder 107 that holds the optical fiber 1.

The laser source 101 is a part for irradiating the optical fiber 1 held by the holder 107 with a laser beam 200. For example, the laser source 101 includes a titanium-sapphire crystal as a laser medium. The laser beam 200 emitted from the laser source 101 is the femtosecond laser beam.

The optical systems added to the laser source 101 include an ND filter 102, an attenuator 103, an electromagnetic shutter 104, an aperture 105, and an objective lens 106. The ND filter 102, the attenuator 103, the electromagnetic shutter 104, the aperture 105, and the objective lens 106 are used to adjust energy (pulse energy), a processing pattern, a beam diameter, and a collective state of the laser beam 200.

The holder 107 is a part for holding the optical fiber 1 that is of the workpiece. The holder 107 is driven in a translational three-axis direction including an X-axis direction, a Y-axis direction, and a Z-axis direction and a θ-direction that is of a rotating direction about a Z-axis by a holder driving mechanism (not illustrated).

In the optical fiber manufacturing method of the first embodiment, using the manufacturing apparatus 100, the laser beam 200 emitted from the laser source 101 is controlled using the optical systems 102 to 106 while the holder 107 holding the optical fiber 1 that is of the workpiece in which the aperture is not formed yet is driven by the holder driving mechanism (not illustrated), thereby irradiating an emitting end of the optical fiber 1 with the laser beam 200 from the emitting end side. Accordingly, the laser processing (damage processing) is performed to a core 4 (see FIGS. 2 and 3) located at the emitting end of the optical fiber 1 to form a light scattering region 5a (see FIGS. 2 and 3) having a disc shape. Therefore, as described later, an optical fiber 1A of the first embodiment in which the aperture is provided is manufactured.

Figure 2:
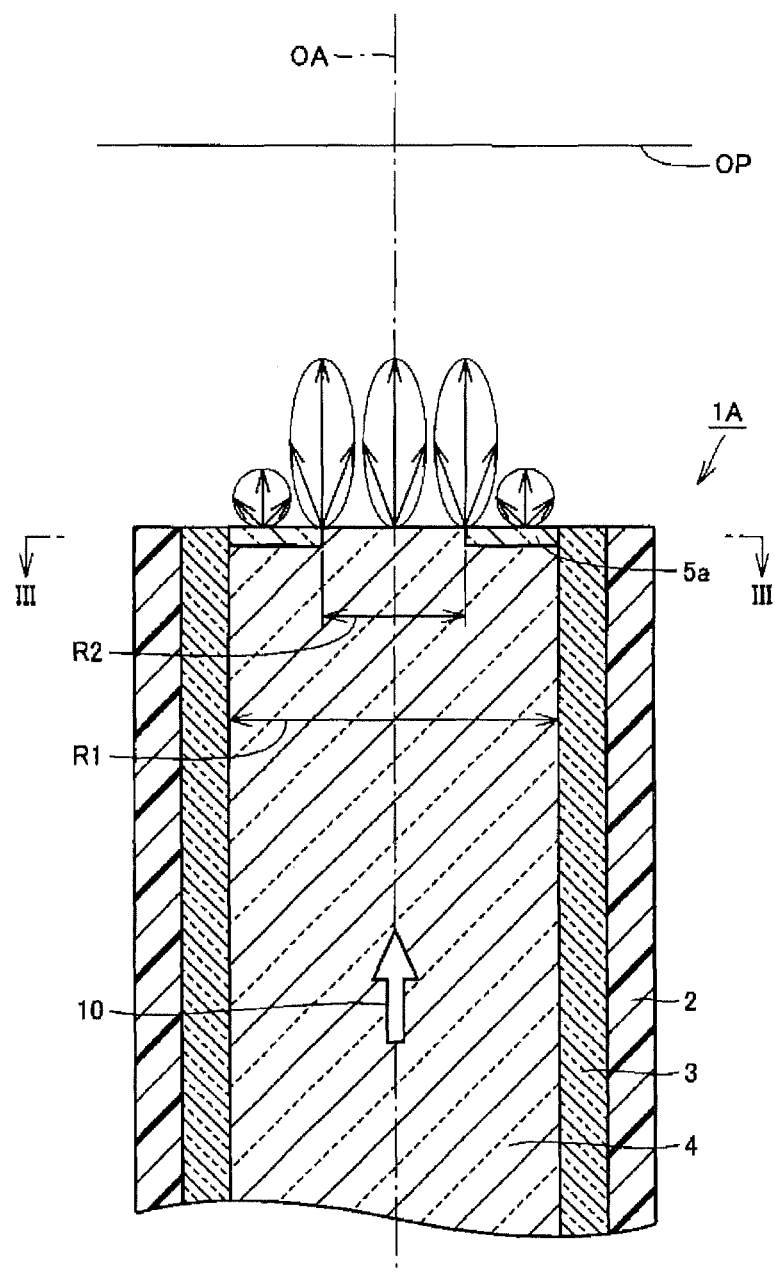
FIG. 2 is a sectional view taken along a plane including an optical axis near an emitting end of an optical fiber according to the first embodiment of the present invention.
Figure 3:
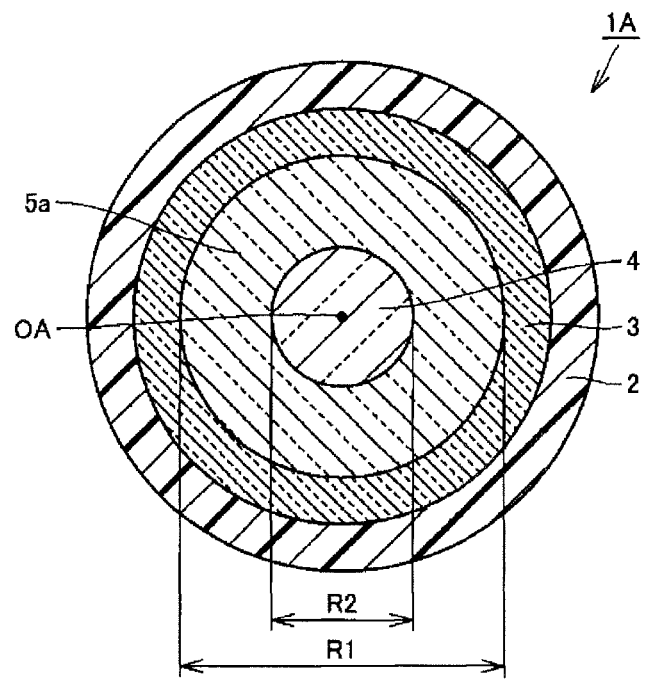
FIG. 3 is a sectional view taken along a plane orthogonal to the optical axis near the emitting end of the optical fiber according to the first embodiment of the present invention.
Figure 4:
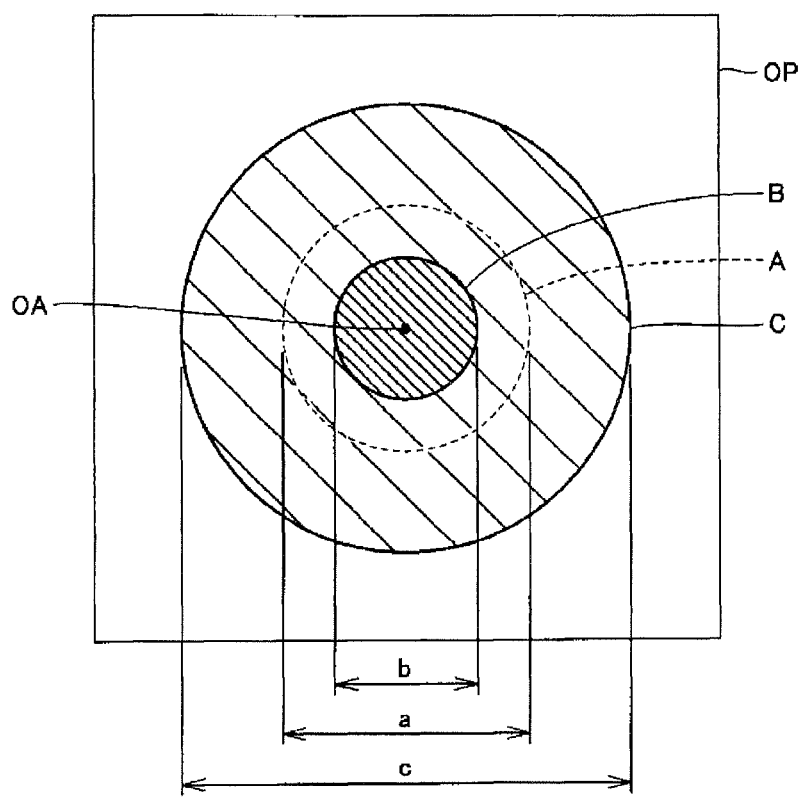
FIG. 4 is a view illustrating a beam spot of light emitting from the emitting end of the optical fiber according to the first embodiment of the present invention.

FIG. 2 is a sectional view taken along a plane including the optical axis near the emitting end of the optical fiber according to the first embodiment of the present invention. FIG. 3 is a sectional view taken along a plane orthogonal to the optical axis near the emitting end of the optical fiber according to the first embodiment of the present invention, and is a view taken along a line of FIG. 2. FIG. 4 is a view illustrating a beam spot of light emitting from the emitting end of the optical fiber according to the first embodiment of the present invention, and is a view illustrating the beam spot in an observation plane OP orthogonal to an optical axis OA of the optical fiber 1A in FIG. 2. The optical fiber 1A of the first embodiment will be described below with reference to FIGS. 2 to 4.

As illustrated in FIGS. 2 and 3, the optical fiber 1A of the first embodiment includes the core 4 that is of a core wire, a clad 3 that covers an outside of the core 4, and a coating material 2 that covers the outside of the clad 3. According to one or more embodiments of the present invention, the optical fiber 1A is constructed by one of a POF (Plastic Optical Fiber) and a GOF (Glass Optical Fiber), and the core 4 and the clad 3 are made of an optical transparency material.

According to one or more embodiments of the present invention, the material suitable for the damage processing is used as the specific material constituting the core 4 and the clad 3. For the POF, a polymer material in which a molecular structure does not include a benzene ring can be cited. For the GOF, all glass materials can be cited. According to one or more embodiments of the present invention, a polymethylmethacrylate (PMMA) resin and a cycloolefin polymer (COP) resin can be used as the polymer material in which the molecular structure does not include the benzene ring. In the case of use of a polymer material (such as a polycarbonate (PC) resin and a polyimide (PI) resin) in which the molecular structure includes the benzene ring, frequently blackening is induced by the laser irradiation as described later in a fifth embodiment of the present invention. Even in such cases, the damage processing can be performed by optimizing the pulse energy. Therefore, the polymer material in which the molecular structure includes the benzene ring can be used.

The light scattering region 5a is provided in the core 4 located at the emitting end of the optical fiber 1A by performing the laser processing with the femtosecond laser beam. The light scattering region 5a is formed into the disc shape having an opening in a center, and provided so as to surround an axis line (that is, the optical axis OA of the optical fiber 1A) of the core 4. There is no particular limitation to a thickness of the light scattering region 5a along the direction of the optical axis OA, but according to one or more embodiments of the present invention, the thickness ranges from about 0.005 mm to about 0.1 mm. According to one or more embodiments of the present invention, the light scattering region 5a having the disc shape is disposed in coaxial with the optical axis OA of the optical fiber 1A.

The light scattering region 5a is a location that is formed by inducing the damage change through the laser processing with the femtosecond laser beam, and is a region where the light scattering region 5a includes micro irregularity from submicron orders to tens submicron orders, which is generated by resolidification or bubble formation. When the light scattering region 5a is irradiated with the light, the light scattering is generated by the micro irregularity.

Therefore, in the light propagating along the direction of an arrow 10 in FIG. 2 in the core 4, a radiation intensity of the light with which the light scattering region 5a is irradiated is weakened by the scattering in the light scattering region 5a compared with the light with which the light scattering region 5a is not irradiated (that is, the light with which the emitting end in the portion, in which the light scattering region 5a of the optical fiber 1A is not provided, is irradiated). As a result, the aperture is formed in the location where the light scattering region 5a is provided.

Therefore, as illustrated in FIG. 4, the beam spot of the light emitting from the emitting end of the optical fiber 1A in the observation plane OP includes a small beam spot B (a diameter b) having the high radiation intensity and a large beam spot C (a diameter c) having the low radiation intensity. The beam spot B is the region irradiated with the light, which does not pass through the light scattering region 5a but emits from the emitting end of the optical fiber 1A, and the beam spot C is the region irradiated with the light, which emits from the emitting end of the optical fiber 1A while passing through the light scattering region 5a to weaken the radiation intensity. A beam spot A (a diameter a) indicated by a broken line in FIG. 4 expresses the region where the observation plane OP is irradiated with the light unless the light scattering region 5a is provided in the optical fiber 1A. At this point, a relationship among the diameters of the beam spots satisfies a condition of b<a≤c.

For example, in the case that the disc-shaped light scattering region including the opening of a diameter R2 of 0.5 mm and the thickness of 0.05 mm is provided in the optical fiber having the core of a diameter R1 of 1.0 mm and a numerical aperture of 0.5, the optical fiber including the core diameter of 0.5 mm at the emitting end and the numerical aperture of 0.5 (that is, the optical fiber that has the numerical aperture of 0.5 while an emitting diameter is restricted to 0.5 mm) can be formed.

As described above, the aperture is constructed by forming the disc-shaped light scattering region 5a at the emitting end of the core 4, whereby the light emitting from the emitting end of the optical fiber 1A is properly narrowed down by the aperture. That is, a radiation intensity distribution in which the radiation intensity is enhanced near the optical axis OA can be provided to the light emitting from the emitting end of the optical fiber 1A, and the beam diameter can properly be narrowed down. The use of the configuration can enhance a beam control property of the light emitting from the emitting end of the optical fiber 1A, and also enhance an S/N ratio.

Even if beam control is further performed by the external optical system using the light emitting from the emitting end of the optical fiber 1A, advantageously a lens having a small effective diameter can be used and it is not necessary to separately provide the aperture. Therefore, downsizing of an external optical system, the decrease of the number of components, and positioning simplification because of the decrease of the number of components can be implemented.

As described above, the optical fiber in which the beam control property of the light emitting from the emitting end is enhanced by adding the aperture function and the manufacturing method thereof can be implemented by adopting the optical fiber 1A of the first embodiment and the manufacturing method thereof.

Second Embodiment

Figure 5:
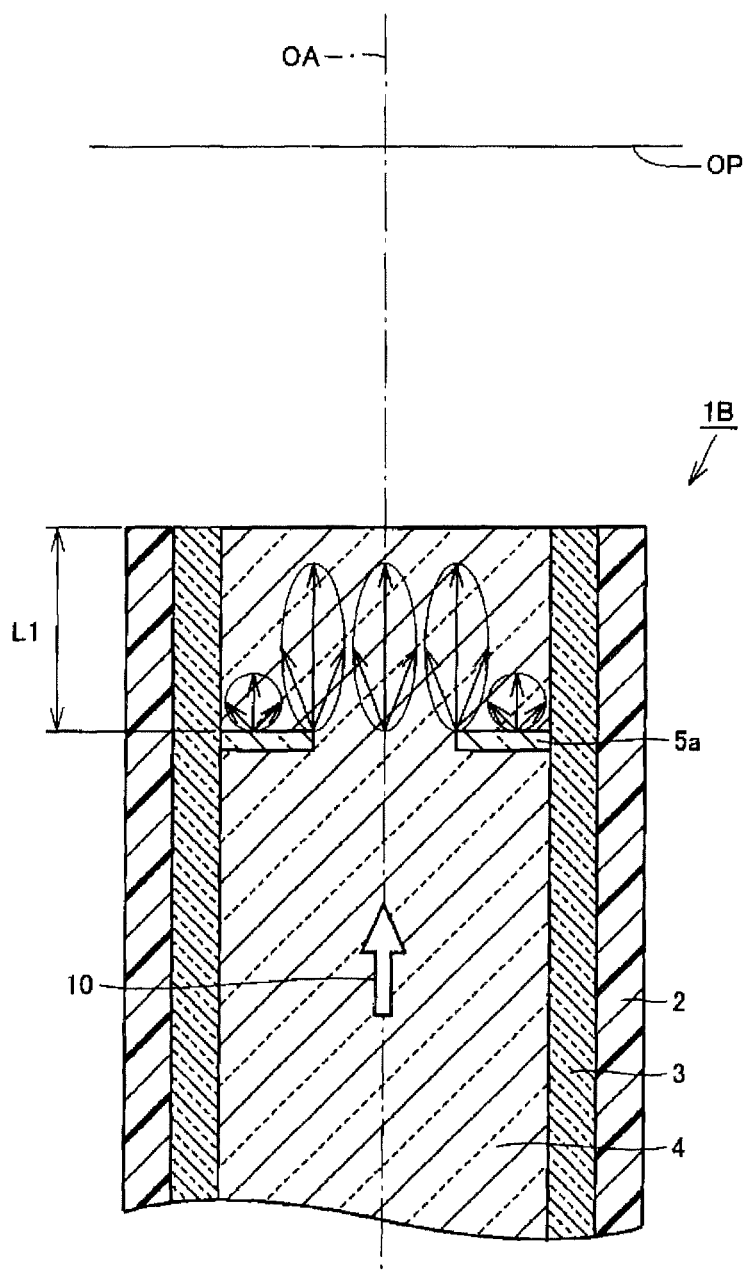
FIG. 5 is a sectional view taken along the plane including the optical axis near the emitting end of an optical fiber according to a second embodiment of the present invention.
Figure 6:
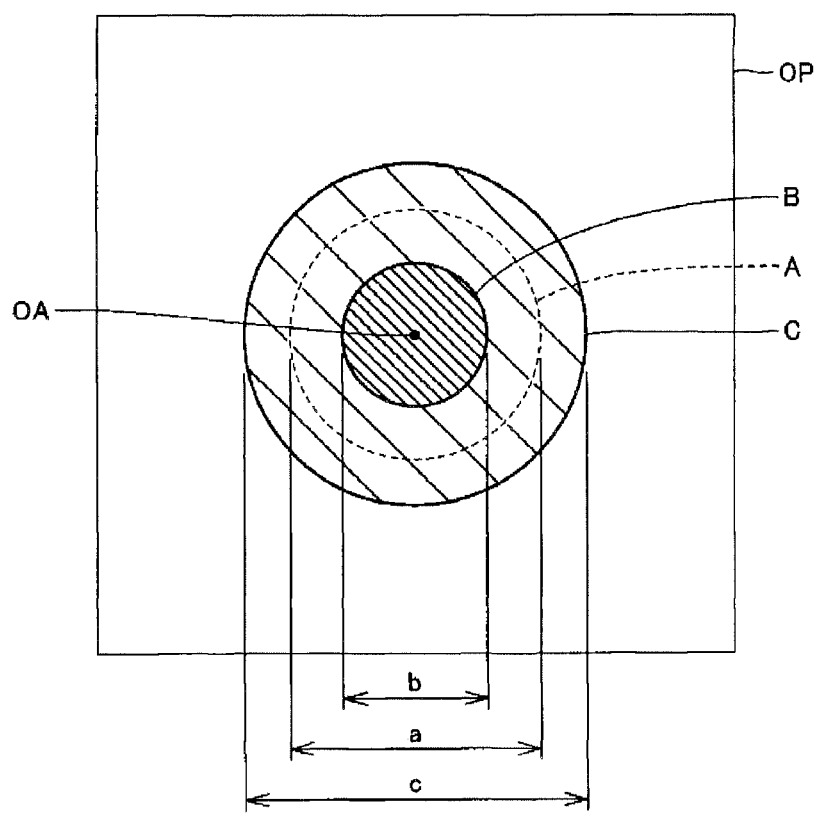
FIG. 6 is a view illustrating the beam spot of the light emitting from the emitting end of the optical fiber according to the second embodiment of the present invention.

FIG. 5 is a sectional view taken along the plane including the optical axis near the emitting end of an optical fiber according to a second embodiment of the present invention. FIG. 6 is a view illustrating the beam spot of the light emitting from the emitting end of the optical fiber according to the second embodiment of the present invention, and is a view illustrating the beam spot in the observation plane OP orthogonal to the optical axis OA of an optical fiber 1B in FIG. 5. The optical fiber 1B of the second embodiment will be described below with reference to FIGS. 5 and 6.

As illustrated in FIG. 5, in the optical fiber 1B of the second embodiment, the light scattering region 5a is formed by performing the laser processing to the core 4 located near the emitting end of the optical fiber 1B using the femtosecond laser beam, thereby providing the aperture. More particularly, the light scattering region 5a having the disc shape is formed in a position, which is retreated from the emitting end of the optical fiber 1B along the optical axis OA of the optical fiber 1B by a distance L1, so as to surround the optical axis OA, thereby forming the aperture.

At this point, it is assumed that the distance L1 is a distance within a range, where the light with which the light scattering region 5a is not irradiated (that is, the light passing through the portion in which the light scattering region 5a of the optical fiber 1B is not provided) reaches the emitting end without being reflected at the interface between the core 4 and clad 3 on the emitting end side of the light scattering region 5a. According to the configuration, almost the light that scatters after the light scattering region 5a is irradiated therewith is incident to the clad 3 through the interface between the core 4 and the clad 3 on the emitting end side rather than in the light scattering region 5a.

For example, the optical fiber 1B of the second embodiment is manufactured using the manufacturing apparatus 100 of the first embodiment of the present invention. Specifically, referring to FIG. 1, the laser beam 200 emitted from the laser source 101 is controlled using the optical systems 102 to 106 while the holder 107 holding the optical fiber 1 that is of the workpiece in which the aperture is not formed yet is driven by the holder driving mechanism (not illustrated), thereby irradiating the vicinity of the emitting end of the optical fiber 1 with the laser beam 200 from the emitting end side. Therefore, the laser processing (the damage processing) is performed to the core 4 (see FIG. 5) located in the vicinity of the emitting end of the optical fiber 1 to form the light scattering region 5a (see FIG. 5) having the disc shape. Accordingly, the optical fiber 1B in which the aperture is provided is manufactured as described above.

In the optical fiber 1B of the second embodiment, as illustrated in FIG. 6, the beam spot of the light emitting from the emitting end of the optical fiber 1B in the observation plane OP includes the small beam spot B (the diameter b) having the high radiation intensity and the large beam spot C (the diameter c) having the low radiation intensity. The beam spot B is the region irradiated with the light, which does not pass through the light scattering region 5a but emits from the emitting end of the optical fiber 1B, and the beam spot C is the region irradiated with the light, which is not incident to the clad 3 but emits from the emitting end of the optical fiber 1B in the light passing through the light scattering region 5a to weaken the radiation intensity. The beam spot A (the diameter a) indicated by the broken line in FIG. 6 expresses the region where the observation plane OP is irradiated with the light unless the light scattering region 5a is provided in the optical fiber 1B. At this point, the relationship among the diameters of the beam spots satisfies a condition of $b<a \leq c$.

As described above, the optical fiber in which the beam control property of the light emitting from the emitting end is further enhanced by adding the aperture function in addition to the effect of the first embodiment and the manufacturing method thereof can be implemented by adopting the optical fiber 1B of the second embodiment and the manufacturing method thereof.

Third Embodiment

Figure 7:
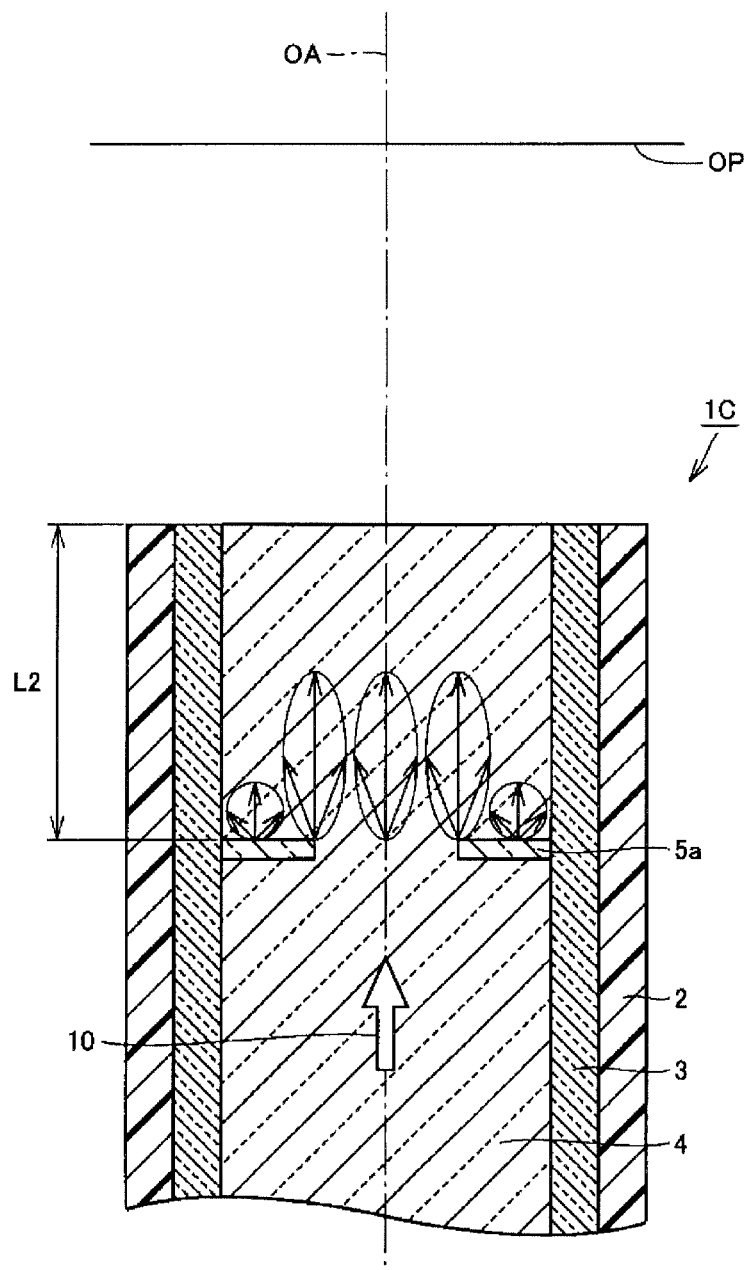
FIG. 7 is a sectional view taken along the plane including the optical axis near the emitting end of an optical fiber according to a third embodiment of the present invention.
Figure 8:
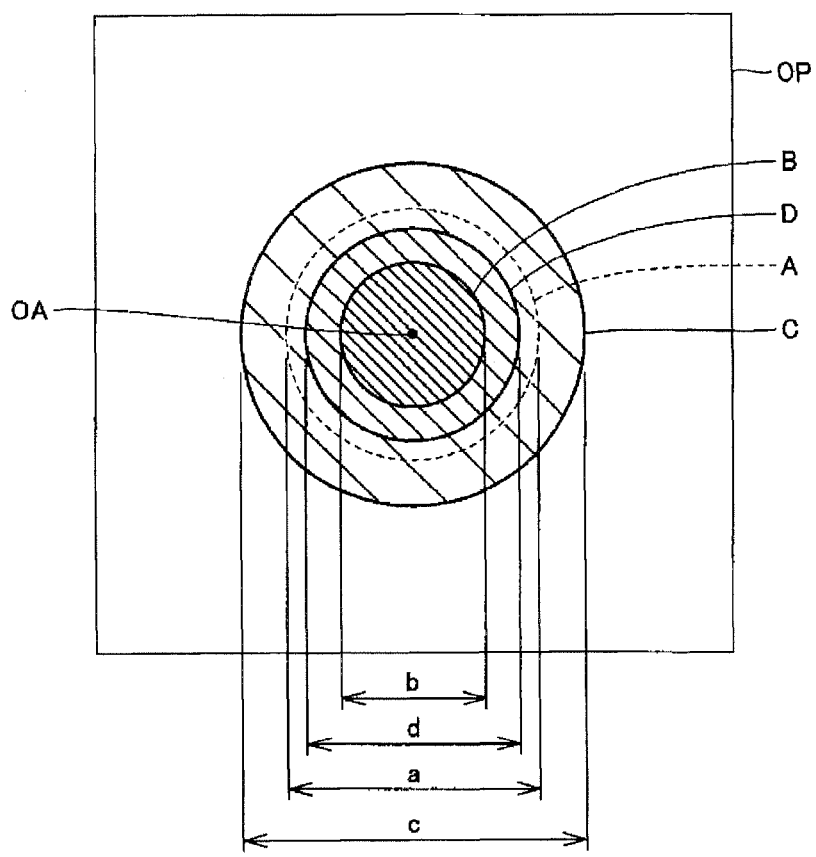
FIG. 8 is a view illustrating the beam spot of the light emitting from the emitting end of the optical fiber according to the third embodiment of the present invention.

FIG. 7 is a sectional view taken along the plane including the optical axis near the emitting end of an optical fiber according to a third embodiment of the present invention. FIG. 8 is a view illustrating the beam spot of light emitting from the emitting end of the optical fiber according to the third embodiment of the present invention, and is a view illustrating the beam spot in the observation plane OP orthogonal to the optical axis OA of an optical fiber 1C in FIG. 7. The optical fiber 1C of the third embodiment will be described below with reference to FIGS. 7 and 8.

As illustrated in FIG. 7, in the optical fiber 1C of the third embodiment, the light scattering region 5a is formed by performing the laser processing to the core 4 located near the emitting end of the optical fiber 1C using the femtosecond laser beam, thereby providing the aperture. More particularly, the light scattering region 5a having the disc shape is formed in a position, which is retreated from the emitting end of the optical fiber 1C along the optical axis OA of the optical fiber 1C by a distance L2, so as to surround the optical axis OA, thereby forming the aperture.

At this point, it is assumed that the distance L2 is a distance within a range, where at least part of the light with which the light scattering region 5a is not irradiated (that is, the light passing through the portion in which the light scattering region 5a of the optical fiber 1C is not provided) reaches the emitting end while being reflected at the interface between the core 4 and clad 3 on the emitting end side of the light scattering region 5a. According to the configuration, almost the light that scatters after the light scattering region 5a is irradiated therewith is incident to the clad 3 through the interface between the core 4 and the clad 3 on the emitting end side rather than in the light scattering region 5a.

For example, the optical fiber 1C of the third embodiment is manufactured using the manufacturing apparatus 100 of the first embodiment of the present invention. Specifically, referring to FIG. 1, the laser beam 200 emitted from the laser source 101 is controlled using the optical systems 102 to 106 while the holder 107 holding the optical fiber 1 that is of the workpiece in which the aperture is not formed yet is driven by the holder driving mechanism (not illustrated), thereby irradiating the vicinity of the emitting end of the optical fiber 1 with the laser beam 200 from the emitting end side. Therefore, the laser processing (the damage processing) is performed to the core 4 (see FIG. 7) located in the vicinity of the emitting end of the optical fiber 1 to form the light scattering region 5a (see FIG. 7) having the disc shape. Accordingly, the optical fiber 1C in which the aperture is provided is manufactured as described above.

In the optical fiber 1C of the third embodiment, as illustrated in FIG. 8, the beam spot of the light emitting from the emitting end of the optical fiber 1C in the observation plane OP includes the small beam spot B (the diameter b) having the high radiation intensity, the large beam spot C (the diameter c) having the low radiation intensity, and a beam spot D (a diameter d) having the diameter and radiation intensity intermediate between the beam spots B and C. The beam spot D is the region irradiated with the light, which emits from the emitting end of the optical fiber 1C while neither passing through the light scattering region 5a nor being reflected at the interface between the core 4 and the clad 3, and the beam spot C is the region irradiated with the light, which is not incident to the clad 3 but emits from the emitting end of the optical fiber 1C in the light passing through the light scattering region 5a to weaken the radiation intensity, and the beam spot B is the region irradiated with the light, which does not pass through the light scattering region 5a but is reflected at the interface between the core 4 and the clad 3 to emit from the emitting end of the optical fiber 1C. The beam spot A (the diameter a) indicated by the broken line in FIG. 8 expresses the region where the observation plane OP is irradiated with the light unless the light scattering region 5a is provided in the optical fiber 1C. At this point, the relationship among the diameters of the beam spots satisfies a condition of $b<d\leq a\leq c$.

As described above, the optical fiber in which the beam control property of the light emitting from the emitting end is further enhanced by adding the aperture function in addition to the effect of the first embodiment and the manufacturing method thereof can be implemented by adopting the optical fiber 1C of the third embodiment and the manufacturing method thereof.

Fourth Embodiment

Figure 9:
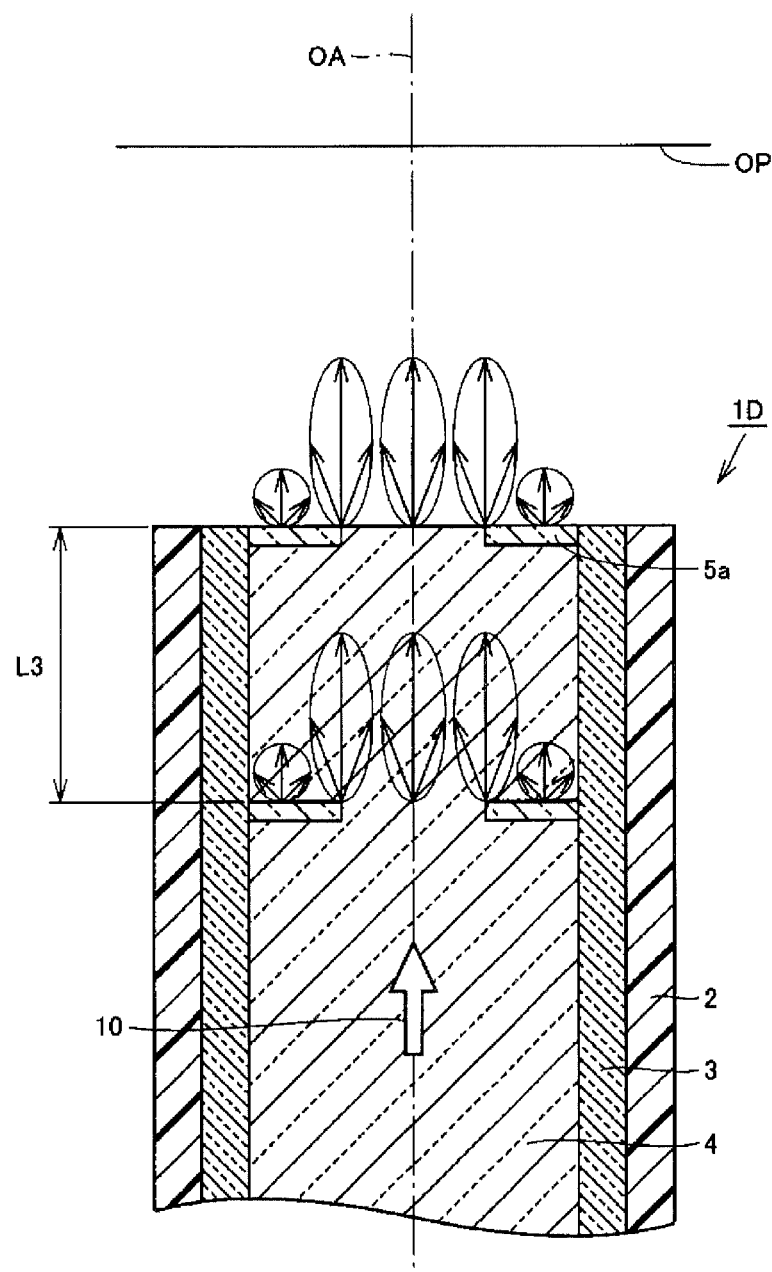
FIG. 9 is a sectional view taken along the plane including the optical axis near the emitting end of an optical fiber according to a fourth embodiment of the present invention.
Figure 10:
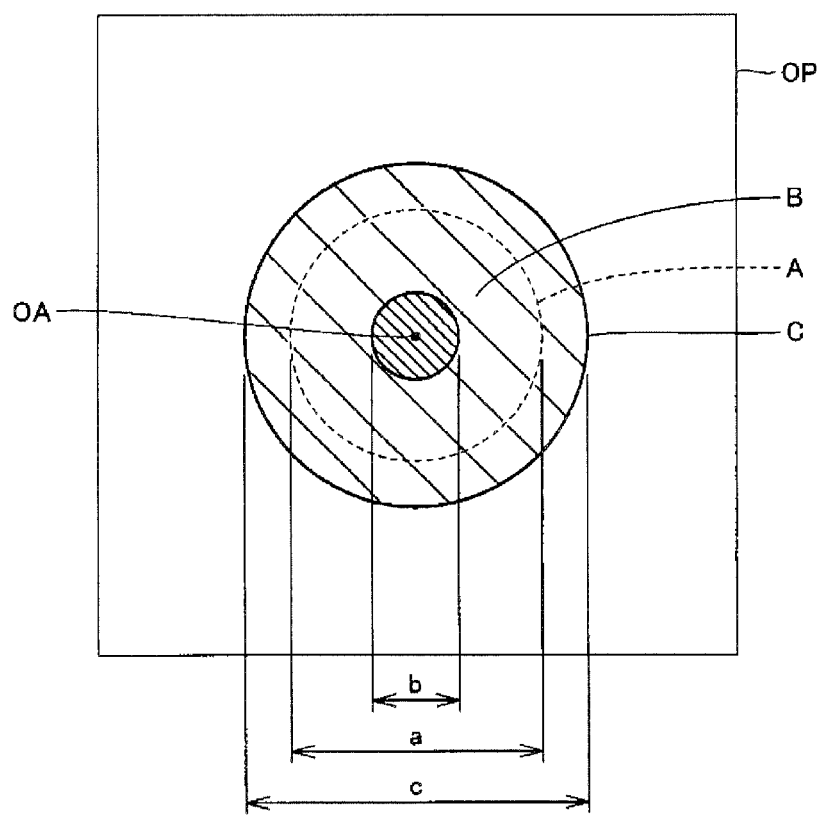
FIG. 10 is a view illustrating the beam spot of the light emitting from the emitting end of the optical fiber according to the fourth embodiment of the present invention.

FIG. 9 is a sectional view taken along the plane including the optical axis near the emitting end of an optical fiber according to a fourth embodiment of the present invention. FIG. 10 is a view illustrating a beam spot of light emitting from the emitting end of the optical fiber according to the fourth embodiment of the present invention, and is a view illustrating the beam spot in the observation plane OP orthogonal to the optical axis OA of an optical fiber 1D in FIG. 9. The optical fiber 1D of the fourth embodiment will be described below with reference to FIGS. 9 and 10.

As illustrated in FIG. 9, in the optical fiber 1D of the fourth embodiment, the light scattering regions 5a are formed into two layers by performing the laser processing to the core 4 located at and near the emitting end of the optical fiber 1D, using the femtosecond laser beam, thereby providing the two apertures. More particularly, the disc-shape light scattering regions 5a are formed into the two layers at the emitting end of the optical fiber 1D and in the position, which is retreated from the emitting end of the optical fiber 1D along the optical axis OA of the optical fiber 1D by a distance L3, so as to surround the optical axis OA, thereby forming the two apertures along the optical axis OA while separated from each other.

At this point, the distance L3 may be a distance within a range, where the light with which the light scattering region 5a is not irradiated (that is, the light passing through the portion in which the light scattering region 5a of the optical fiber 1D is not provided) reaches the emitting end without being reflected at the interface between the core 4 and clad 3 on the emitting end side of the light scattering region 5a, or a distance within a range, where at least part of the light reaches the emitting end while being reflected at the interface between the core 4 and clad 3 on the emitting end side of the light scattering region 5a. According to the configuration, almost the light that scatters after the light scattering region 5a located on the incident end side is irradiated therewith is incident to the clad 3 through the interface between the core 4 and the clad 3 on the emitting end side rather than in the light scattering region 5a, or scatters further after the light scattering region 5a located on the emitting end side is irradiated therewith.

For example, the optical fiber 1D of the fourth embodiment is manufactured using the manufacturing apparatus 100 of the first embodiment of the present invention. Specifically, referring to FIG. 1, the laser beam 200 emitted from the laser source 101 is controlled using the optical systems 102 to 106 while the holder 107 holding the optical fiber 1 that is of the workpiece in which the aperture is not formed yet is driven by the holder driving mechanism (not illustrated), thereby irradiating the emitting end of the optical fiber 1 and the vicinity of the emitting end with the laser beam 200 from the emitting end side. Therefore, the laser processing (the damage processing) is performed to the core 4 (see FIG. 7) located at and near the emitting end of the optical fiber 1 to form the disc-shaped light scattering regions 5a (see FIG. 7) into two layers. Accordingly, the optical fiber 1D in which the two apertures are provided is manufactured as described above.

In the optical fiber 1D of the fourth embodiment, as illustrated in FIG. 10, the beam spot of the light emitting from the emitting end of the optical fiber 1D in the observation plane OP includes the small beam spot B (the diameter b) having the high radiation intensity and the large beam spot C (the diameter c) having the low radiation intensity. The beam spot B is the region irradiated with the light, which does not pass through the light scattering regions 5a of the two layers but emits from the emitting end of the optical fiber 1D, and the beam spot C is the region irradiated with the light, which is not incident to the clad 3 but emits from the emitting end of the optical fiber 1D in the light passing through one of the light scattering regions 5a of two layers to weaken the radiation intensity. The beam spot A (the diameter a) indicated by the broken line in FIG.

10 expresses the region where the observation plane OP is irradiated with the light unless the light scattering regions 5a of two layers are provided in the optical fiber 1D. At this point, the relationship among the diameters of the beam spots satisfies a condition of b<a<c.

As described above, the optical fiber in which the beam control property of the light emitting from the emitting end is further enhanced by adding the aperture function in addition to the effect of the first embodiment and the manufacturing method thereof can be implemented by adopting the optical fiber 1D of the fourth embodiment and the manufacturing method thereof.

Fifth Embodiment

Figure 11:
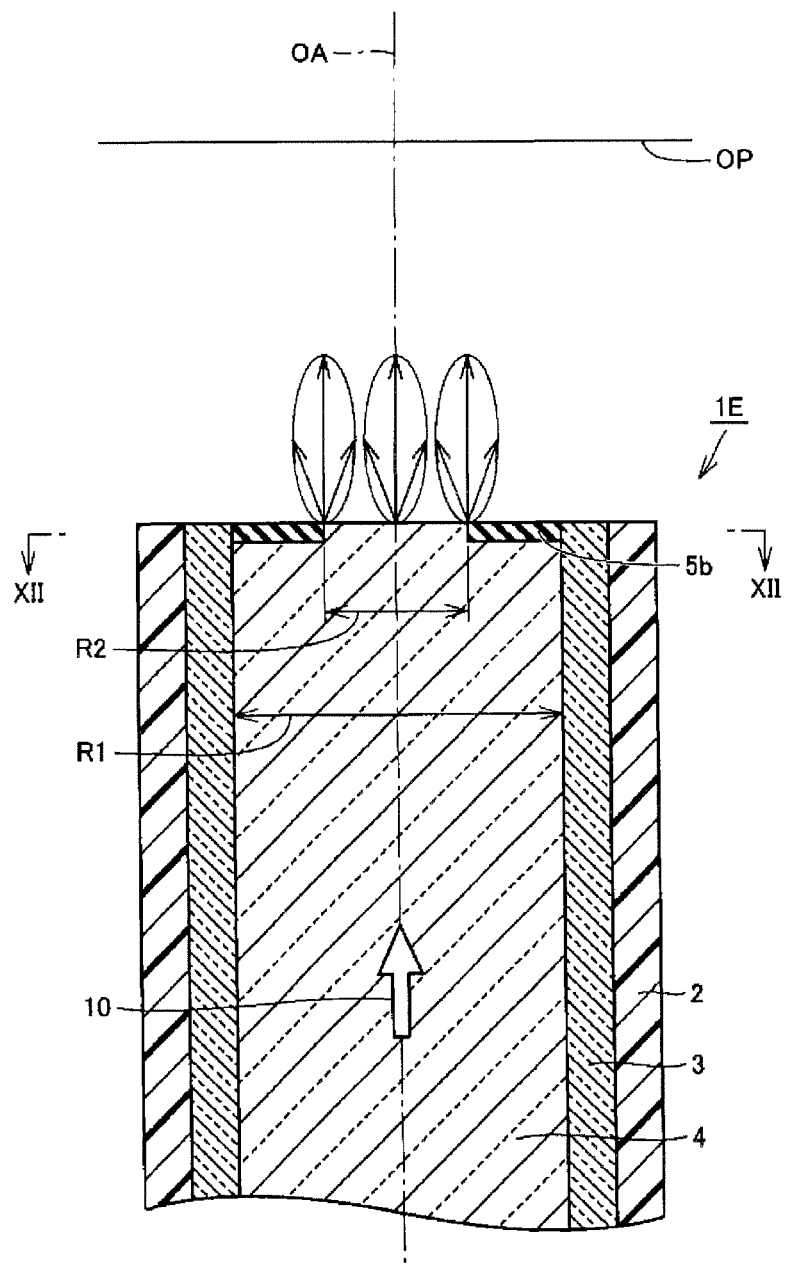
FIG. 11 is a sectional view taken along the plane including the optical axis near the emitting end of an optical fiber according to a fifth embodiment of the present invention.
Figure 12:
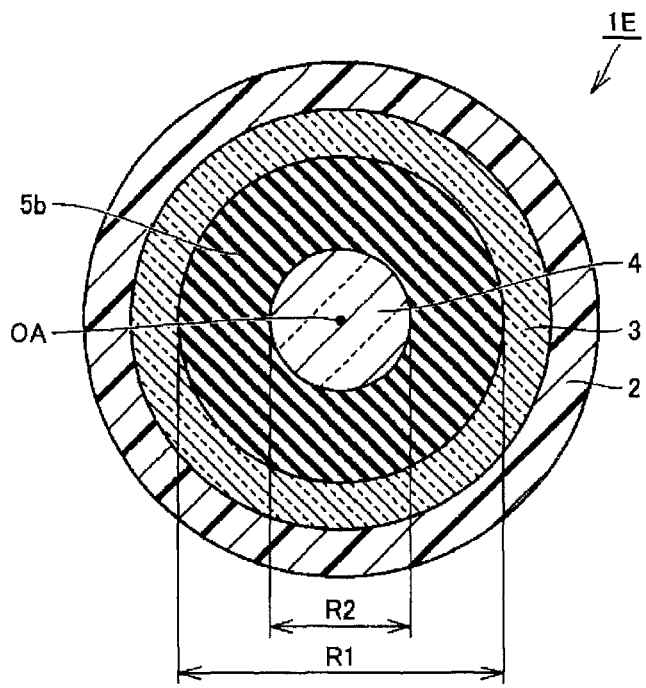
FIG. 12 is a sectional view taken along the plane orthogonal to the optical axis near the emitting end of the optical fiber according to the fifth embodiment of the present invention.
Figure 13:
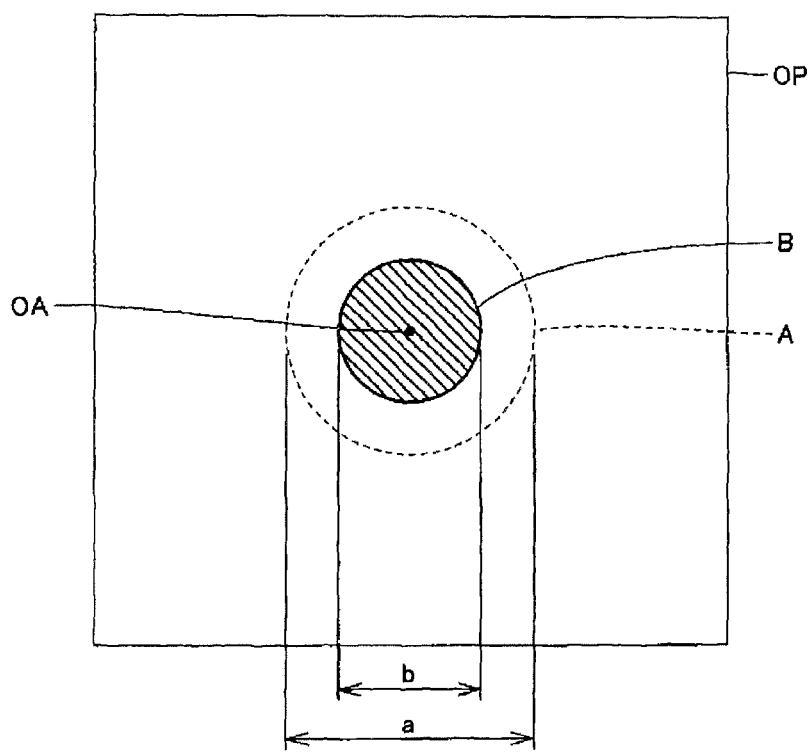
FIG. 13 is a view illustrating the beam spot of the light emitting from the emitting end of the optical fiber according to the fifth embodiment of the present invention.

FIG. 11 is a sectional view taken along the plane including the optical axis near the emitting end of an optical fiber according to a fifth embodiment of the present invention. FIG. 12 is a sectional view taken along the plane orthogonal to the optical axis near the emitting end of the optical fiber according to the fifth embodiment of the present invention, and is a view taken on a line XII-XII of FIG. 11. FIG. 13 is a view illustrating the beam spot of the light emitting from the emitting end of the optical fiber according to the fifth embodiment of the present invention, and is a view illustrating the beam spot in the observation plane OP orthogonal to the optical axis OA of an optical fiber 1E in FIG. 11. The optical fiber 1E of the fifth embodiment will be described below with reference to FIGS. 11 to 13.

As illustrated in FIGS. 11 and 12, the optical fiber 1E of the fifth embodiment includes the core 4 that is of the core wire, the clad 3 that covers the outside of the core 4, and the coating material 2 that covers the outside of the clad 3. According to one or more embodiments of the present invention, the optical fiber 1E is constructed by the POF, and the core 4 and the clad 3 are made of the optical transparency material.

According to one or more embodiments of the present invention, the material suitable for the blackening processing is used as the specific material constituting the core 4 and the clad 3, and the polymer material in which the molecular structure includes the benzene ring can be cited. According to one or more embodiments of the present invention, the polycarbonate (PC) resin and the polyimide (PI) resin can be used as the polymer material in which the molecular structure includes the benzene ring.

A light absorption region 5b is provided in the core 4 located at the emitting end of the optical fiber 1E by performing the laser processing with the femtosecond laser beam. The light absorption region 5b is formed into the disc shape having the opening in the center, and provided so as to surround the axis line (that is, the optical axis OA of the optical fiber 1E) of the core 4. There is no particular limitation to the thickness of the light absorption region 5b along the direction of the optical axis OA, but according to one or more embodiments of the present invention, the thickness ranges from about 0.005 mm to about 0.1 mm. According to one or more embodiments of the present invention, the light absorption region 5b having the disc shape is disposed in coaxial with the optical axis OA of the optical fiber 1E.

For example, the optical fiber 1E of the fifth embodiment is manufactured using the manufacturing apparatus 100 of the first embodiment of the present invention. Specifically, referring to FIG. 1, the laser beam 200 emitted from the laser source 101 is controlled using the optical systems 102 to 106 while the holder 107 holding the optical fiber 1 that is of the workpiece in which the aperture is not formed yet is driven by the holder driving mechanism (not illustrated), thereby irradiating the emitting end of the optical fiber 1 with the laser beam 200 from the emitting end side. Therefore, the laser processing (the blackening processing) is performed to the core 4 (see FIGS. 11 and 12) located at the emitting end of the optical fiber 1 to form the light absorption region 5b (see FIGS. 11 and 12) having the disc shape. Accordingly, the optical fiber 1E in which the aperture is provided is manufactured as described above.

The light absorption region 5b is the place formed by inducing the blackening through the laser processing with the femtosecond laser beam, and is the region generated by carbonization alteration. When the light absorption region 5b is irradiated with the light, light absorption is mainly generated. Sometimes part of the irradiation light is not absorbed by the light absorption region 5b but transmitted according to the generation of the carbonization alteration. However, the intensity of the transmitted light is extremely weakened, and the scattering is also generated. Therefore, the irradiation light has the radiation intensity to an extent to which the radiation intensity is substantially negligible.

Therefore, in the light propagating in the core 4 along the direction of the arrow 10 in FIG. 11, the light with which the light absorption region 5b is irradiated is absorbed by the light absorption region 5b to weaken the radiation intensity compared with the light with which the light absorption region 5b is not irradiated (that is, the light with which the emitting end at which the light absorption region 5b of the optical fiber 1E is not provided). As a result, the aperture is formed in the place where the light absorption region 5b is provided.

Therefore, as illustrated in FIG. 13, the beam spot of the light emitting from the emitting end of the optical fiber 1E in the observation plane OP includes only the small beam spot B (the diameter b) having the high radiation intensity. At this point, the beam spot B is the region irradiated with the light, which does not pass through the light absorption region 5b but emits from the emitting end of the optical fiber 1E. The beam spot A (the diameter a) indicated by the broken line in FIG. 13 expresses the region where the observation plane OP is irradiated with the light unless the light absorption region 5b is provided in the optical fiber 1E. At this point, the relationship among the diameters of the beam spots satisfies a condition of b<a.

For example, in the case that the disc-shaped light absorption region including the opening of the diameter R2 of 0.5 mm and the thickness of 0.03 mm is provided in the optical fiber having the core of the diameter R1 of 1.0 mm and the numerical aperture of 0.5, the optical fiber including the core diameter of 0.5 mm at the emitting end and the numerical aperture of 0.5 (that is, the optical fiber that has the numerical aperture of 0.5 while the emitting diameter is restricted to 0.5 mm) can be formed.

As described above, the aperture is constructed by forming the disc-shaped light absorption region 5b at the emitting end of the core 4, whereby the light emitting from the emitting end of the optical fiber 1E is properly narrowed down by the aperture. That is, the radiation intensity distribution in which the radiation intensity is enhanced near the optical axis OA can be provided to the light emitting from the emitting end of the optical fiber 1E, and the beam diameter can properly be narrowed down. The use of the configuration can enhance the beam control property of the light emitting from the emitting end of the optical fiber 1E, and also enhance the S/N ratio.

Even if the beam control is further performed by the external optical system using the light emitting from the emitting end of the optical fiber 1E, advantageously the lens having the small effective diameter can be used and it is not necessary to separately provide the aperture. Therefore, the downsizing of the external optical system, the decrease of the number of components, and the positioning simplification because of the decrease of the number of components can be implemented.

As described above, the optical fiber in which the beam control property of the light emitting from the emitting end is enhanced by adding the aperture function and the manufacturing method thereof can be implemented by adopting the optical fiber 1E of the fifth embodiment and the manufacturing method thereof.

Sixth Embodiment

Figure 14:
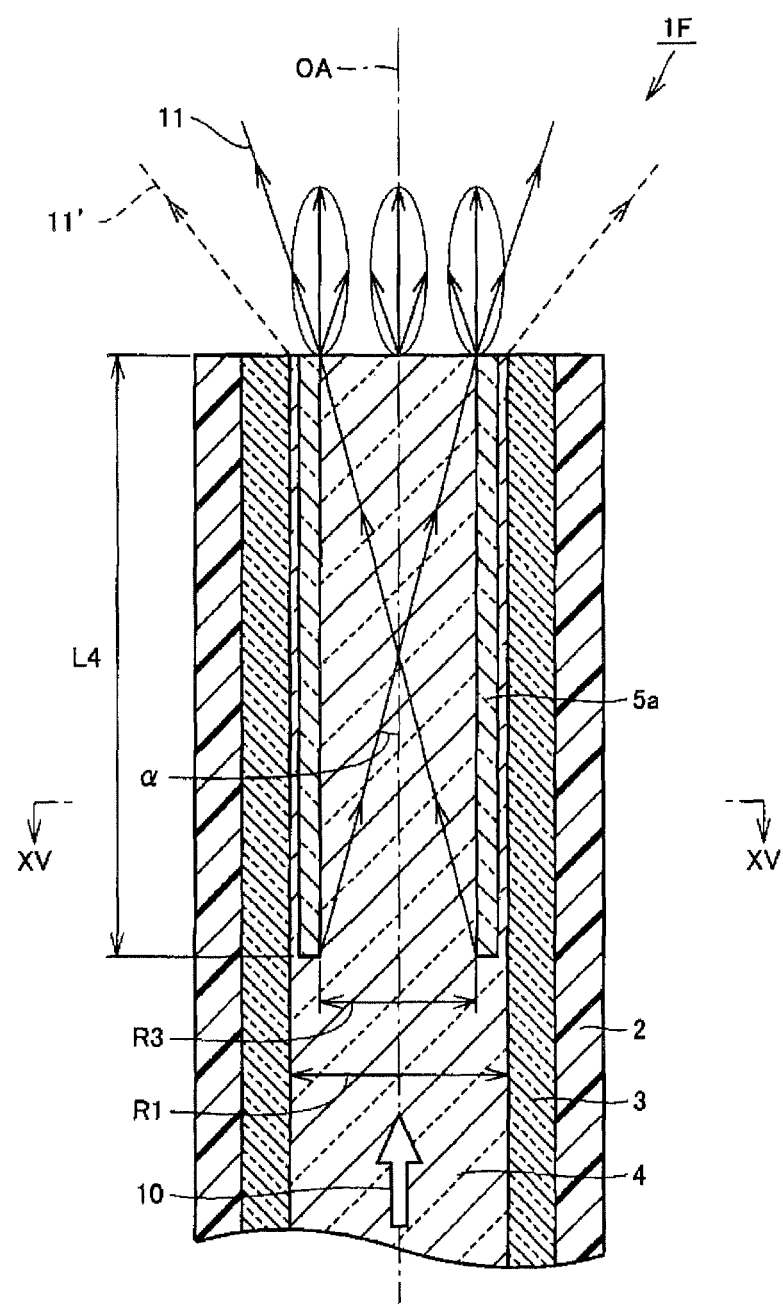
FIG. 14 is a sectional view taken along the plane including the optical axis near the emitting end of an optical fiber according to a sixth embodiment of the present invention.
Figure 15:
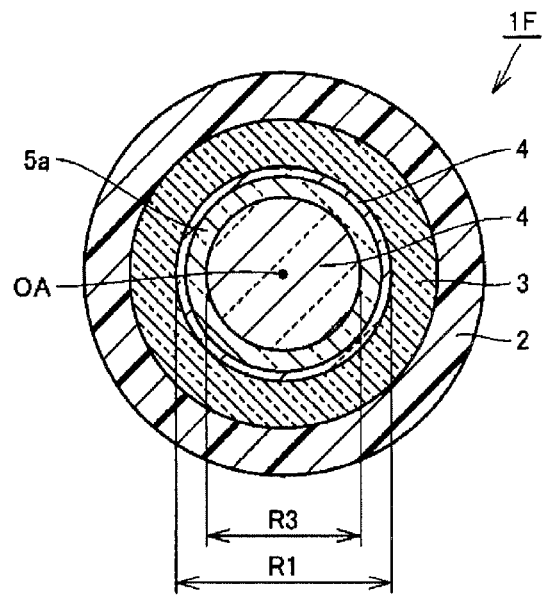
FIG. 15 is a sectional view taken along the plane orthogonal to the optical axis near the emitting end of the optical fiber according to the sixth embodiment of the present invention.

FIG. 14 is a sectional view taken along the plane including the optical axis near the emitting end of an optical fiber according to a sixth embodiment of the present invention. FIG. 15 is a sectional view taken along the plane orthogonal to the optical axis near the emitting end of the optical fiber according to the sixth embodiment of the present invention, and is a view taken along a line XV-XV of FIG. 14. An optical fiber 1F of the first embodiment will be described below with reference to FIGS. 14 and 15.

As illustrated in FIGS. 14 and 15, in the optical fiber 1F of the sixth embodiment, the light scattering region 5a is formed by performing the laser processing to the core 4 located at and near the emitting end of the optical fiber 1F using the femtosecond laser beam. The light scattering region 5a is continuously provided so as to reach a position, which is retreated from the emitting end of the optical fiber 1F along the optical axis OA of the optical fiber 1F by a distance L4, thereby being formed into a cylindrical shape having a hollow portion, and the light scattering region 5a is provided so as to surround the axis line (that is, the optical axis OA of the optical fiber 1F) of the core 4.

The light scattering region 5a formed into the cylindrical shape has a sufficient length in the axial direction, and is discriminated from the disc-shaped light scattering region of the first embodiment from the viewpoint of an optical property. There is no particular limitation to the thickness of the light scattering region 5a along a radial direction, but according to one or more embodiments of the present invention, the thickness ranges from about 0.005 mm to about 0.1 mm. According to one or more embodiments of the present invention, the light scattering region 5a having the cylindrical shape is disposed in coaxial with the optical axis OA of the optical fiber 1F.

The length (that is, the distance L4) in the axial direction of the cylindrical-shaped light scattering region 5a is set to a predetermined length, whereby an inner circumferential surface of the light scattering region 5a is irradiated with part of the light propagating in the core 4. The light with which the light scattering region 5a is irradiated is not totally reflected, but mainly scattered by light scattering region 5a. Therefore, as illustrated in FIG. 15, the light scattering region 5a is irradiated with the light having an inclination larger than an inclination α with respect to the optical axis OA of the light, which propagates between the position on the incident end side of the inner circumferential surface of the light scattering region 5a and the position on the emitting end side of the inner circumferential surface of the light scattering region 5a so as to intersect the optical axis OA in a section including the optical axis OA, and the light having the inclination is scattered to weaken the radiation intensity. As a result, the aperture is formed in the place where the light scattering region 5a is provided.

For example, the optical fiber 1F of the sixth embodiment is manufactured using the manufacturing apparatus 100 of the first embodiment of the present invention. Specifically, referring to FIG. 1, the laser beam 200 emitted from the laser source 101 is controlled using the optical systems 102 to 106 while the holder 107 holding the optical fiber 1 that is of the workpiece in which the aperture is not formed yet is driven by the holder driving mechanism (not illustrated), thereby irradiating the emitting end of the optical fiber 1 and the vicinity of the emitting end with the laser beam 200 from the emitting end side. Therefore, the laser processing (the damage processing) is performed to the core 4 (see FIGS. 14 and 15) located at and near the emitting end of the optical fiber 1 to form the cylindrical-shaped light scattering region 5a (see FIGS. 14 and 15). Accordingly, the optical fiber 1F in which the aperture is provided is manufactured as described above.

In the optical fiber 1F of the sixth embodiment, as described above, the light having the inclination larger than the inclination α with respect to the optical axis OA is scattered by the light scattering region 5a. Therefore, the light scattering region 5a is not irradiated with almost the light emitting from the emitting end of the optical fiber 1F, but the light has the inclination smaller than the inclination α. Accordingly, as illustrated in FIG. 14, the light emitting from the emitting end of the optical fiber 1F becomes light 11 in which a maximum value of the emitting angle is restricted to a predetermined value, and the apparent numerical aperture of the optical fiber 1F can be decreased on the emitting end side. In FIG. 14, light 11' is the light emitting from the emitting end unless the light scattering region 5a is provided in the optical fiber 1F.

For example, in the case that the cylindrical-shaped light scattering region including the hollow portion of a diameter R3 of 0.9 mm and the length of 5.0 mm and the radial thickness of 0.05 mm is provided in the optical fiber having the core of the diameter R1 of 1.0 mm and the numerical aperture of 0.5, the property of the emitting light at the emitting end of the optical fiber can be equalized to the property of the emitting light at the emitting end side of the optical fiber having the numerical aperture of about a little less than 0.3.

As described above, the aperture is constructed by forming the cylindrical-shaped light scattering region 5a at and near the emitting end of the core 4, whereby the light emitting from the emitting end of the optical fiber 1F is properly narrowed down by the aperture. As a result, the light emitting from the emitting end of the optical fiber 1F becomes the low-spread-angle light in which only the radiation intensity of the light is enhanced within the range of the desired emitting angle. In the light having the emitting angle corresponding to the numerical aperture of the optical fiber 1F, only the light having the lower emitting angle can selectively emit from the emitting end of the optical fiber 1F. The use of the configuration can enhance the beam control property of the light emitting from the emitting end of the optical fiber 1F, and also enhance the S/N ratio.

Even if the beam control is further performed by the external optical system using the light emitting from the emitting end of the optical fiber 1F, advantageously the lens having the small effective diameter can be used and it is not necessary to separately provide the aperture. Therefore, the downsizing of the external optical system, the decrease of the number of components, and the positioning simplification because of the decrease of the number of components can be implemented.

As described above, the optical fiber in which the beam control property of the light emitting from the emitting end is enhanced by adding the aperture function and the manufacturing method thereof can be implemented by adopting the optical fiber 1F of the sixth embodiment and the manufacturing method thereof.

Seventh Embodiment

Figure 16:
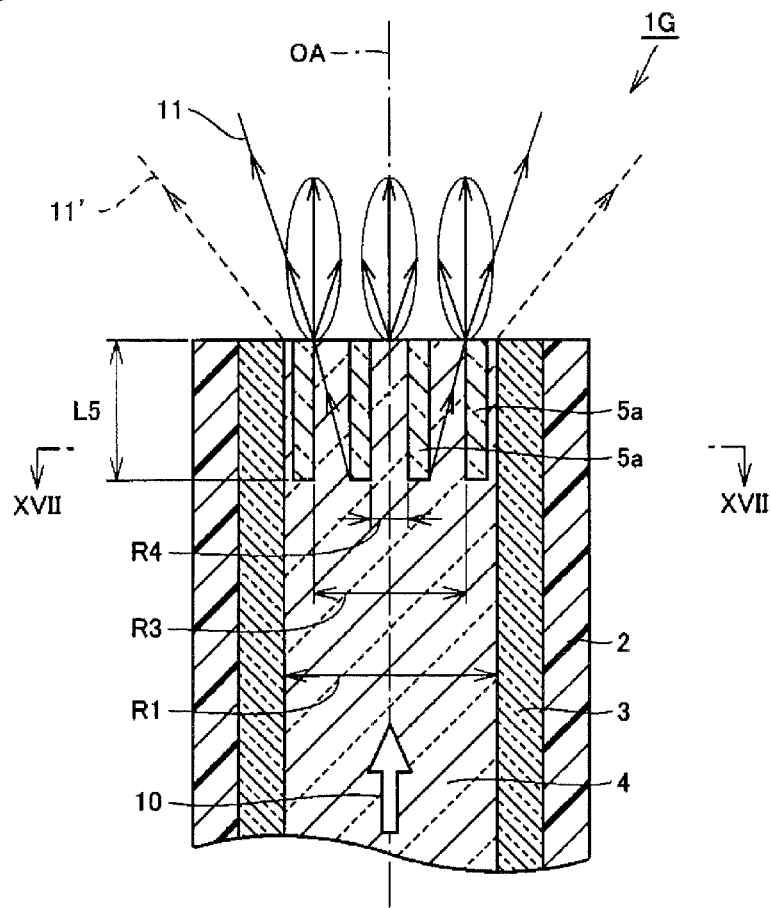
FIG. 16 is a sectional view taken along the plane including the optical axis near the emitting end of an optical fiber according to a seventh embodiment of the present invention.
Figure 17:
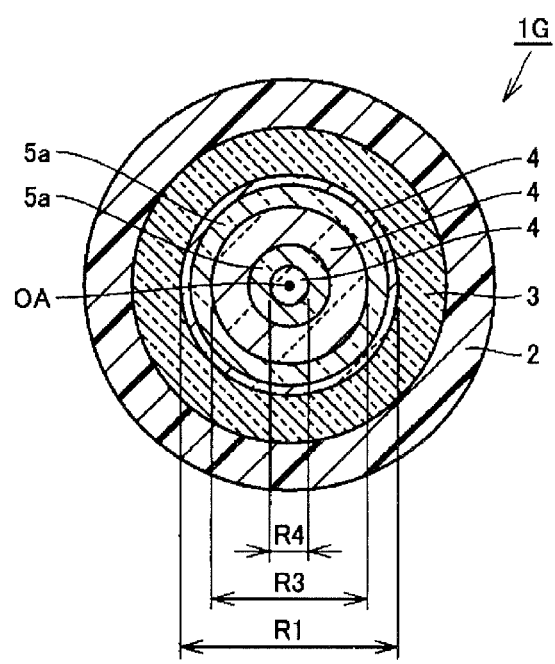
FIG. 17 is a sectional view taken along the plane orthogonal to the optical axis near the emitting end of the optical fiber according to the seventh embodiment of the present invention.

FIG. 16 is a sectional view taken along the plane including the optical axis near the emitting end of an optical fiber according to a seventh embodiment of the present invention. FIG. 17 is a sectional view taken along the plane orthogonal to the optical axis near the emitting end of the optical fiber according to the seventh embodiment of the present invention, and is a view taken along a line XVII-XVII of FIG. 16. An optical fiber 1G of the seventh embodiment will be described below with reference to FIGS. 16 and 17.

As illustrated in FIGS. 16 and 17, in the optical fiber 1G of the seventh embodiment, the orbicular-zone light scattering regions 5a of two layers are formed by performing the laser processing to the core 4 located at and near the emitting end of the optical fiber 1G using the femtosecond laser beam, thereby providing the one aperture that functions optically integrally. More particularly, each of the orbicular-zone light scattering regions 5a of two layers is continuously provided so as to reach a position, which is retreated from the emitting end of the optical fiber 1G along the optical axis OA of the optical fiber 1G by a distance L5, thereby being formed into the cylindrical shape having the hollow portion, and the two light scattering regions 5a are provided while separated from each other in the direction orthogonal to the optical axis OA to form the one aperture that surrounds the optical axis OA.

For example, the optical fiber 1G of the seventh embodiment is manufactured using the manufacturing apparatus 100 of the first embodiment of the present invention. Specifically, referring to FIG. 1, the laser beam 200 emitted from the laser source 101 is controlled using the optical systems 102 to 106 while the holder 107 holding the optical fiber 1 that is of the workpiece in which the aperture is not formed yet is driven by the holder driving mechanism (not illustrated), thereby irradiating the emitting end of the optical fiber 1 and the vicinity of the emitting end with the laser beam 200 from the emitting end side. Therefore, the laser processing (the damage processing) is performed to the core 4 (see FIGS. 14 and 15) located at and near the emitting end of the optical fiber 1 to form the cylindrical-shaped light scattering regions 5a (see FIGS. 14 and 15) of the two layers. Accordingly, the optical fiber 1G is manufactured while the aperture that functions optically integrally is provided as described above.

In the optical fiber 1G of the seventh embodiment, compared with the optical fiber 1F of the sixth embodiment, advantageously the aperture that exerts the optically-equal function can be constructed by the light scattering region 5a shortened along the axial direction. For example, as illustrated in FIG. 16, in the case that the cylindrical light scattering region 5a having an inner diameter R4 (=(⅓)×R3) is further provided inside the cylindrical light scattering region 5a having an inner diameter R3, the length (that is, the length indicated by the distance L5) in the axial direction of the light scattering region 5a can be shortened to about ⅓ compared with the single-layer cylindrical light scattering region.

For example, the cylindrical outside light scattering region including the hollow portion having the diameter R3 of 0.9 mm and the length of 1.7 mm and the radial thickness of 0.05 mm is provided in the optical fiber having the core diameter R1 of 1.0 mm and the numerical aperture of 0.5, and the cylindrical inside light scattering region including the hollow portion having the diameter R4 of 0.3 mm and the length of 1.7 mm and the radial thickness of 0.05 mm is further provided inside the outside light scattering region. In this case, similarly to the case that the inside light scattering region is not provided but the length of the outside light scattering region is set to 5.0 mm, the property of the emitting light on the emitting end side of the optical fiber can be equalized to the property of the emitting light on the emitting end side of the optical fiber having the numerical aperture of about a little less than 0.3.

When the optical fiber 1G of the seventh embodiment and the manufacturing method thereof are adopted, in addition to the effect of the sixth embodiment, it is not necessary to irradiate the optical fiber to the deep position during the laser processing through which the light scattering region 5a is formed. Therefore, advantageously the aperture can easily be formed with no energy loss.

Eighth Embodiment

Figure 18:
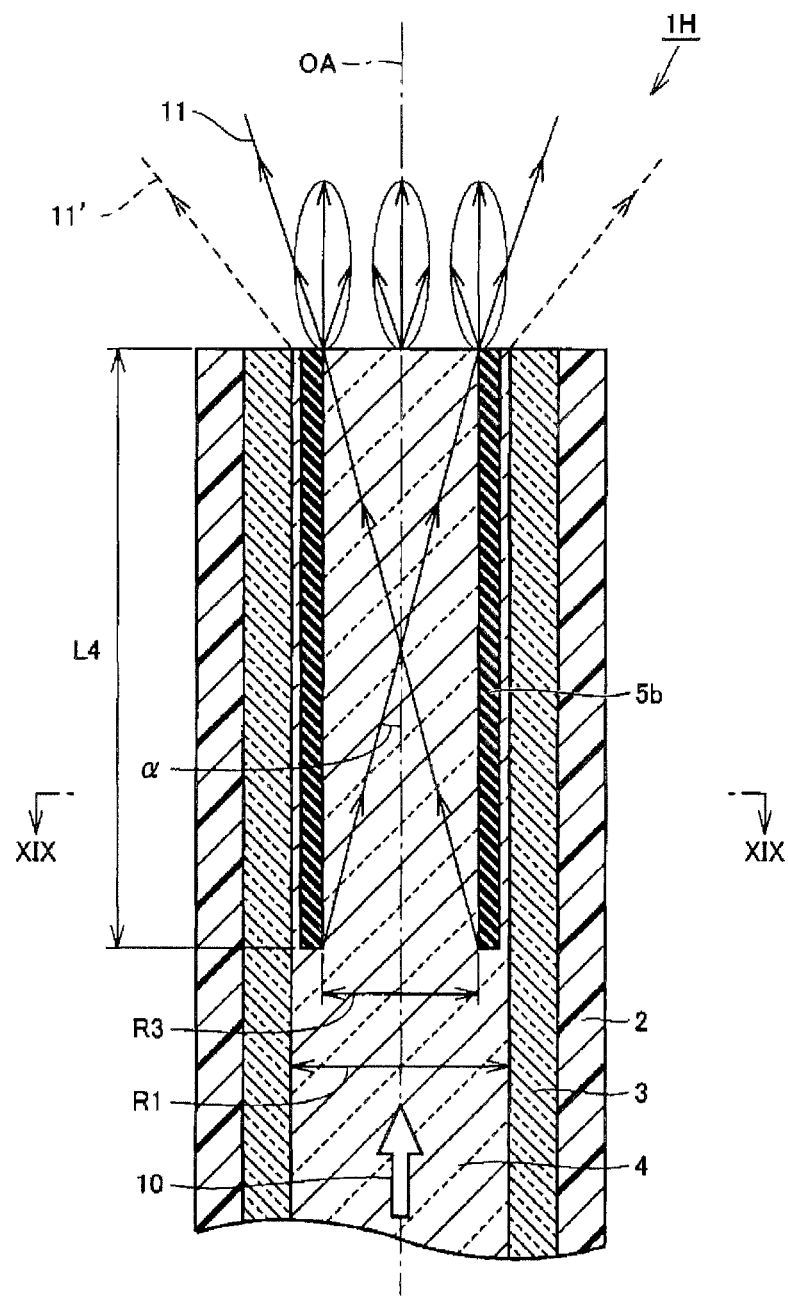
FIG. 18 is a sectional view taken along the plane including the optical axis near the emitting end of an optical fiber according to an eighth embodiment of the present invention.
Figure 19:
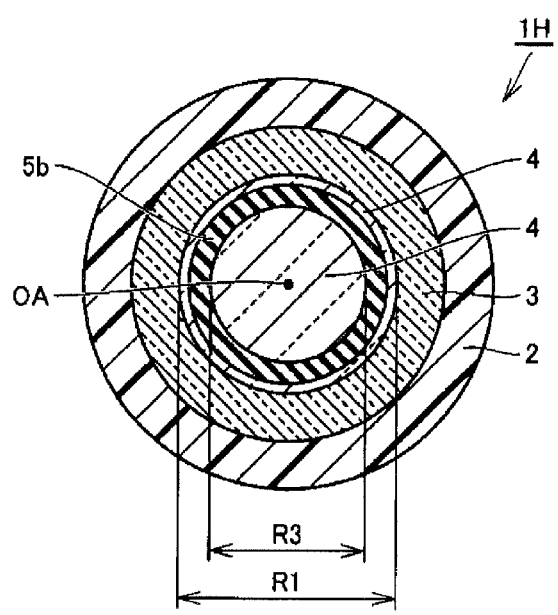
FIG. 19 is a sectional view taken along the plane orthogonal to the optical axis near the emitting end of the optical fiber according to the eighth embodiment of the present invention.

FIG. 18 is a sectional view taken along the plane including the optical axis near the emitting end of an optical fiber according to an eighth embodiment of the present invention. FIG. 19 is a sectional view taken along the plane orthogonal to the optical axis near the emitting end of the optical fiber according to the eighth embodiment of the present invention, and is a view taken on a line XIX-XIX of FIG. 18. An optical fiber 1H of the eighth embodiment will be described below with reference to FIGS. 18 and 19.

As illustrated in FIGS. 18 and 19, in the optical fiber 1H of the eighth embodiment, the light absorption region 5b is formed by performing the laser processing to the core 4 located at the emitting end of the optical fiber 1H and in the vicinity of the emitting end using the femtosecond laser beam. The light absorption region 5b is continuously provided so as to reach the position, which is retreated from the emitting end of the optical fiber 1H along the optical axis OA of the optical fiber 1H by the distance L4, thereby being formed into the cylindrical shape having the hollow portion, and the light absorption region 5b is provided so as to surround the axis line (that is, the optical axis OA of the optical fiber 1H) of the core 4.

The light absorption region 5b formed into the cylindrical shape has the sufficient length in the axial direction, and is discriminated from the disc-shaped light scattering region of the fifth embodiment from the viewpoint of the optical property. There is no particular limitation to the radial thickness of the light scattering region 5b, but according to one or more embodiments of the present invention, the thickness ranges from about 0.005 mm to about 0.1 mm. According to one or more embodiments of the present invention, the light absorption region 5b having the cylindrical shape is disposed in coaxial with the optical axis OA of the optical fiber 1H.

The length in the axial direction of the cylindrical-shaped light absorption region 5b is set to the predetermined length, whereby the inner circumferential surface of the light absorption region 5b is irradiated with part of the light propagating in the core 4. The light with which the light absorption region 5b is irradiated is not totally reflected, but mainly absorbed by light absorption region 5b. Therefore, as illustrated in FIG. 19, the light absorption region 5b is irradiated with the light having the inclination larger than the inclination α with respect to the optical axis OA of the light, which propagates between the position on the incident end side of the inner circumferential surface of the light absorption region 5b and the position on the emitting end side of the inner circumferential surface of the light absorption region 5b so as to intersect the optical axis OA in the section including the optical axis OA, and the light having the inclination is absorbed to weaken the radiation intensity. As a result, the aperture is formed in the place where the light absorption region 5b is provided.

For example, the optical fiber 1H of the eighth embodiment is manufactured using the manufacturing apparatus 100 of the first embodiment of the present invention. Specifically, referring to FIG. 1, the laser beam 200 emitted from the laser source 101 is controlled using the optical systems 102 to 106 while the holder 107 holding the optical fiber 1 that is of the workpiece in which the aperture is not formed yet is driven by the holder driving mechanism (not illustrated), thereby irradiating the emitting end of the optical fiber 1 and the vicinity of the emitting end with the laser beam 200 from the emitting end side. Therefore, the laser processing (the blackening processing) is performed to the core 4 (see FIGS. 18 and 19) located at or near the emitting end of the optical fiber 1 to form the cylindrical-shaped light absorption region 5b (see FIGS. 18 and 19). Accordingly, the optical fiber 1H in which the aperture is provided is manufactured as described above.

In the optical fiber 1H of the seventh embodiment, as described above, the light having the inclination larger than the inclination α with respect to the optical axis OA is absorbed by the light absorption region 5b. Therefore, the light absorption region 5b is not irradiated with almost the light emitting from the emitting end of the optical fiber 1H, but the light has the inclination larger than the inclination α. Accordingly, as illustrated in FIG. 18, the light emitting from the emitting end of the optical fiber 1H becomes light 11 in which the maximum value of the emitting angle is restricted to the predetermined value, and the apparent numerical aperture of the optical fiber 1H can be decreased on the emitting end side. In FIG. 18, light 11' is the light emitting from the emitting end unless the light scattering region 5a is provided in the optical fiber 1H.

For example, in the case that the cylindrical-shaped light absorption region including the hollow portion of the diameter R3 of 0.9 mm and the length of 5.0 mm and the radial thickness of 0.03 mm is provided in the optical fiber having the core diameter R1 of 1.0 mm and the numerical aperture of 0.5, the property of the emitting light at the emitting end side of the optical fiber can be equalized to the property of the emitting light at the emitting end side of the optical fiber having the numerical aperture of about a little less than 0.3.

As described above, the aperture is constructed by forming the cylindrical-shaped light absorption region 5b at and near the emitting end of the core 4, whereby the light emitting from the emitting end of the optical fiber 1H is properly narrowed down by the aperture. As a result, the light emitting from the emitting end of the optical fiber 1H becomes the low-spread-angle light in which only the radiation intensity of the light is enhanced within the range of the desired emitting angle. In the light having the emitting angle corresponding to the numerical aperture of the optical fiber 1H, only the light having the lower emitting angle can selectively emit from the emitting end of the optical fiber 1H. The use of the configuration can enhance the beam control property of the light emitting from the emitting end of the optical fiber 1H, and also enhance the S/N ratio.

Even if the beam control is further performed by the external optical system using the light emitting from the emitting end of the optical fiber 1H, advantageously the lens having the small effective diameter can be used and it is not necessary to separately provide the aperture. Therefore, the downsizing of the external optical system, the decrease of the number of components, and the positioning simplification because of the decrease of the number of components can be implemented.

As described above, the optical fiber in which the beam control property of the light emitting from the emitting end is enhanced by adding the aperture function and the manufacturing method thereof can be implemented by adopting the optical fiber 1H of the eighth embodiment and the manufacturing method thereof.

Ninth Embodiment

Figure 20:
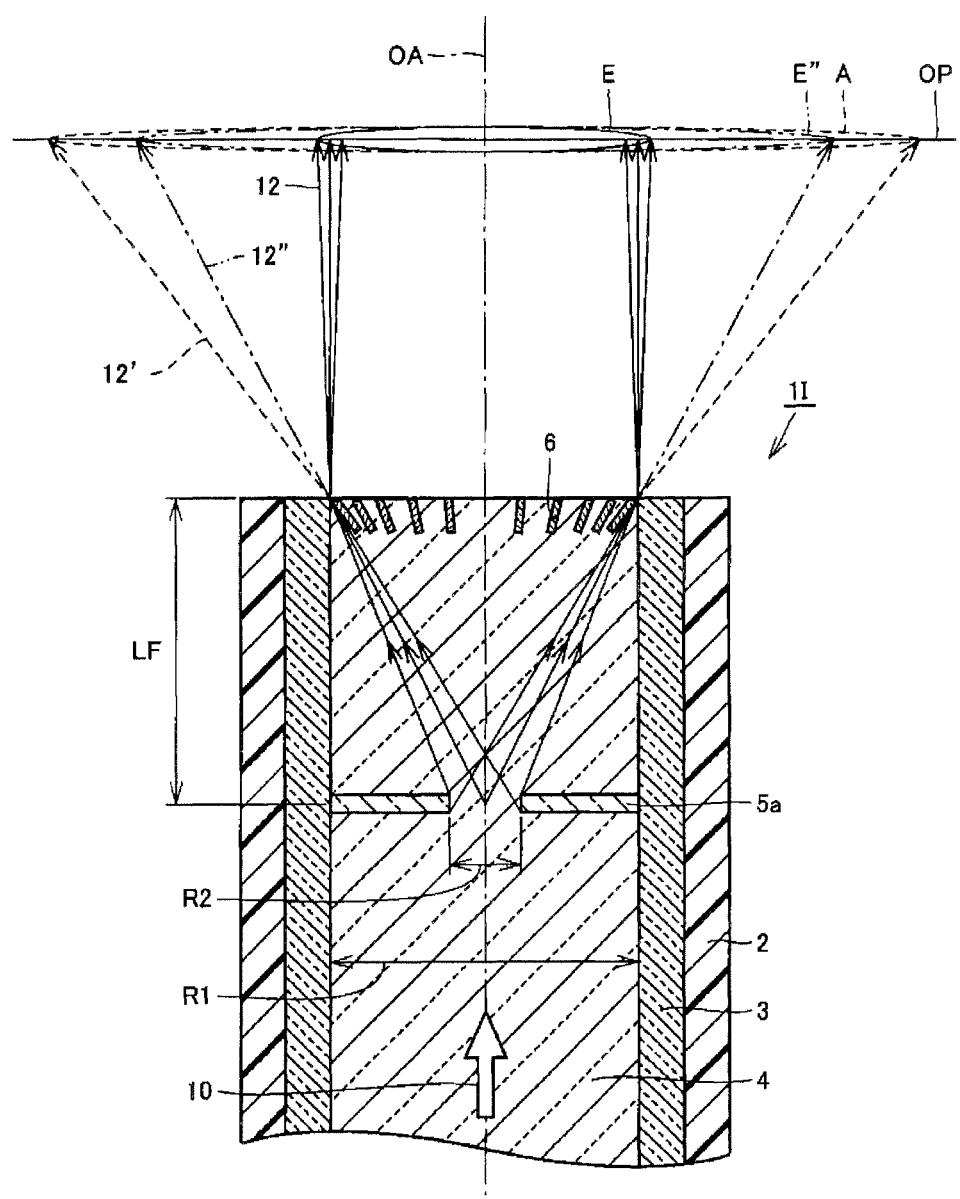
FIG. 20 is a sectional view taken along the plane including the optical axis near the emitting end of an optical fiber according to a ninth embodiment of the present invention, and is a view schematically illustrating the beam spot of the light emitting from the emitting end of the optical fiber.

FIG. 20 is a sectional view taken along the plane including the optical axis near the emitting end of an optical fiber according to a ninth embodiment of the present invention, and is a view schematically illustrating the beam spot of the light emitting from the emitting end of the optical fiber. An optical fiber 1I of the ninth embodiment will be described with reference to FIG. 20.

As illustrated in FIG. 20, the optical fiber 1I of the ninth embodiment includes a lens 6 at the emitting end and in the vicinity of the emitting end in addition to the disc-shaped light scattering region 5a that acts as the aperture. Various lenses such as a Fresnel lens, a binary lens, and a refracting lens can be used as the lens 6. The Fresnel lens is used in the optical fiber 1I of the ninth embodiment.

The emitting end of the optical fiber 1I and the vicinity of the emitting end are irradiated with the femtosecond laser beam to induce a refractive index change, thereby forming the lens 6. Accordingly, in the optical fiber 1I of the ninth embodiment, both the light scattering region 5a and the lens 6 can be formed by the laser processing using the manufacturing apparatus 100 of the first embodiment of the present invention.

The light scattering region 5a is provided in a position retreated from the emitting end of the optical fiber 1I along the optical axis OA of the optical fiber 1I by a distance LF. At this point, it is assumed that the distance LF corresponds to a focal distance of the lens 6.

In the configuration, after the light propagating in the core 4 along the direction of the arrow 10 in FIG. 20 is properly narrowed down by the aperture, which is disposed in a focal position of the lens 6 and constructed by the formation of the light scattering region 5a, the lens 6 is irradiated with the light. Therefore, the light emits from the emitting end of the optical fiber 1I while being converted into pseudo collimate light 12 traveling in substantially parallel with the optical axis OA of the optical fiber 1I.

Therefore, the beam spot in the observation plane OP orthogonal to the optical axis OA of the optical fiber 1I includes only a small beam spot E having the high radiation intensity as illustrated in FIG. 20. Light 12' indicated by the broken line in FIG. 20 and the beam spot A express the light emitting from the emitting end and the region of the observation plane OP irradiated with the light unless the light scattering region 5a and the lens 6 are not provided in the optical fiber 1I. Light 12" indicated by an alternate long and two short dashes line in FIG. 20 and a beam spot E" express the light emitting from the emitting end and the region of the observation plane OP irradiated with the light when not the light scattering region 5a but only the lens 6 is provided in the optical fiber 1I.

For example, the lens having the numerical aperture of 0.5 is provided near the emitting end of the optical fiber having the core diameter R1 of 1.0 mm and the numerical aperture of 0.5, and the disc-shaped light scattering region including the opening having the diameter R2 of 0.1 mm and the thickness of 0.05 mm is provided in the position that is of the focal position of the lens and is 1.4 mm away from the emitting end of the optical fiber. In this case, the pseudo collimate light in which a half angle of the spread angle is restricted to about 3° emits from the emitting end.

As described above, the lens 6 is formed at the emitting end of the core 4, and the disc-shape light scattering region 5a is formed in the focal position of the lens 6, which allows the beam control to be performed to the light emitting from the optical fiber 1I such that the desired light (in this case, the substantially parallel light in which the beam spot is properly narrowed down) is obtained. The use of the configuration can enhance the beam control property of the light emitting from the emitting end of the optical fiber 1I, and also enhance the S/N ratio.

Even if the beam control is further performed by the external optical system using the light emitting from the emitting end of the optical fiber 1I, advantageously the lens having the small effective diameter can be used and it is not necessary to separately provide the aperture. Therefore, the downsizing of the external optical system, the decrease of the number of components, and the positioning simplification because of the decrease of the number of components can be implemented.

As described above, the optical fiber in which the beam control property of the light emitting from the emitting end is enhanced by adding the aperture function and the lens function and the manufacturing method thereof can be implemented by adopting the optical fiber 1I of the ninth embodiment and the manufacturing method thereof.

Tenth Embodiment

Figure 21:
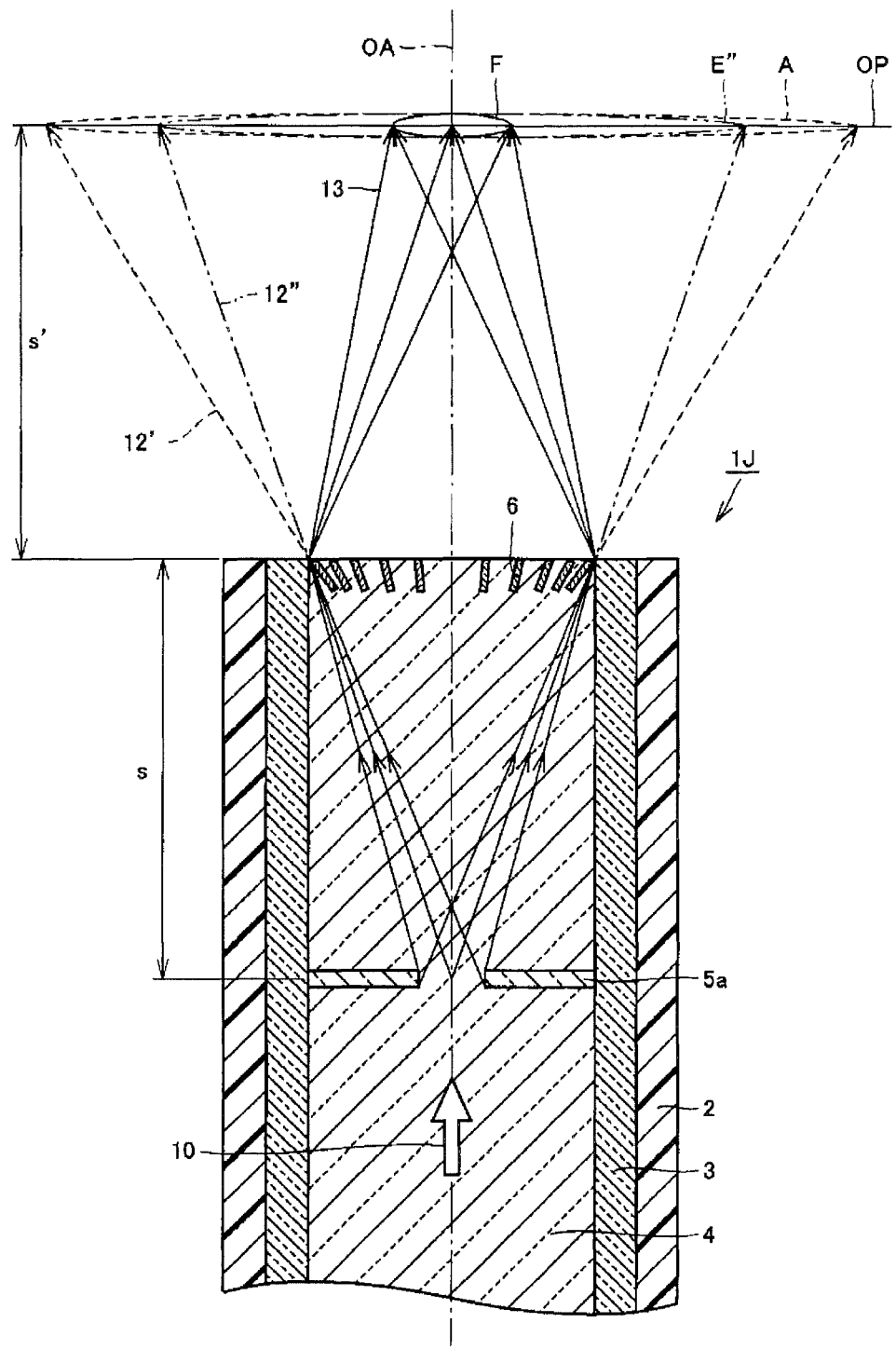
FIG. 21 is a sectional view taken along the plane including the optical axis near the emitting end of an optical fiber according to a tenth embodiment of the present invention, and is a view schematically illustrating the beam spot of the light emitting from the emitting end of the optical fiber.

FIG. 21 is a sectional view taken along the plane including the optical axis near the emitting end of an optical fiber according to a tenth embodiment of the present invention, and is a view schematically illustrating the beam spot of the light emitting from the emitting end of the optical fiber. An optical fiber 1J of the tenth embodiment will be described with reference to FIG. 21.

As illustrated in FIG. 21, the optical fiber 1J of the tenth embodiment differs from the optical fiber 1I of the ninth embodiment only in the position where the light scattering region 5a is formed. That is, in the optical fiber 1J of the tenth embodiment, the light scattering region 5a is disposed in a finite position on the incident end side of the focal position of the lens 6. Specifically, the light scattering region 5a is provided in a position retreated from the emitting end of the optical fiber 1J along the optical axis OA of the optical fiber 1J by a distance s (at this point, the distance s is greater than the distance LF in FIG. 20).

In the configuration, after the light propagating in the core 4 along the direction of the arrow 10 in FIG. 21 is properly narrowed down by the aperture constructed by the formation of the light scattering region 5a, the lens 6 is irradiated with the light. Therefore, the image of light 13 emits from the emitting end of the optical fiber 1J is formed in a projection position determined by $(n/s)+(1/s')=1/f$. Where n is the refractive index of the core 4, s' is the distance from the lens 6 to an image plane in a projection direction, and f is the focal distance of the lens 6.

Therefore, the beam spot in the observation plane OP (in this case, the observation plane OP is set to the image plane of the lens 6) orthogonal to the optical axis OA of the optical fiber 1J includes only a small beam spot F having the high radiation intensity as illustrated in FIG. 21. The light 12' indicated by the broken line in FIG. 21 and the beam spot A express the light emitting from the emitting end and the region of the observation plane OP irradiated with the light unless the light scattering region 5a and the lens 6 are not provided in the optical fiber 1J. The light 12" indicated by the alternate long and two short dashes line in FIG. 21 and the beam spot E" express the light emitting from the emitting end and the region of the observation plane OP irradiated with the light when not the light scattering region 5a but only the lens 6 is provided in the optical fiber 1J.

As described above, the lens 6 is formed at the emitting end of the core 4, and the disc-shape light scattering region 5a is formed in the finite position of the lens 6, which allows the beam control to be performed to the light emitting from the optical fiber 1I such that the desired light (in this case, the light that is collected in the finite position by properly narrowing down the beam spot) is obtained. The use of the configuration can enhance the beam control property of the light emitting from the emitting end of the optical fiber 1J, and also enhance the S/N ratio.

Even if the beam control is further performed by the external optical system using the light emitting from the emitting end of the optical fiber 1J, advantageously the lens having the small effective diameter can be used and it is not necessary to separately provide the aperture. Therefore, the downsizing of the external optical system, the decrease of the number of components, and the positioning simplification because of the decrease of the number of components can be implemented.

As described above, the optical fiber in which the beam control property of the light emitting from the emitting end is enhanced by adding the aperture function and the lens function and the manufacturing method thereof can be implemented by adopting the optical fiber 1J of the tenth embodiment and the manufacturing method thereof.

Eleventh Embodiment

Figure 22:
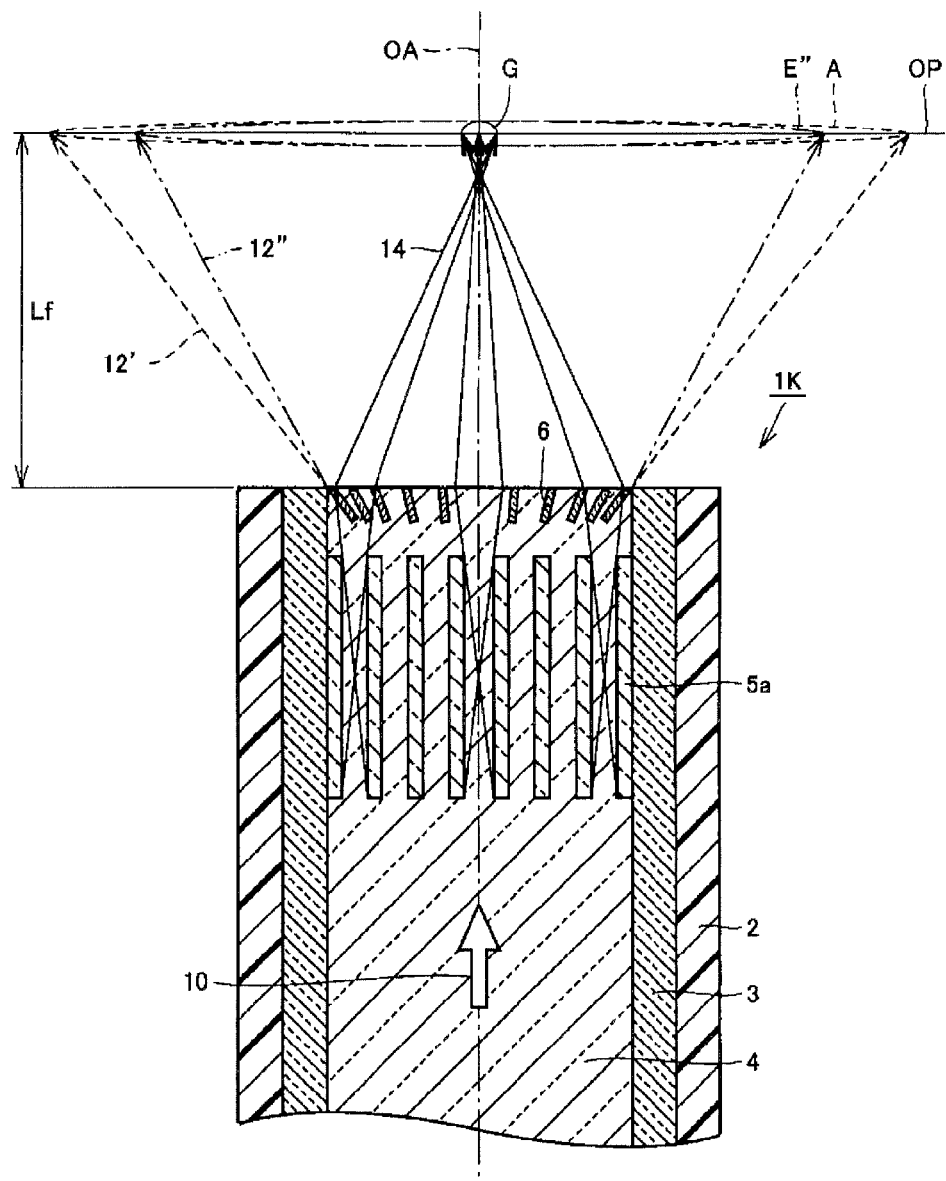
FIG. 22 is a sectional view taken along the plane including the optical axis near the emitting end of an optical fiber according to an eleventh embodiment of the present invention, and is a view schematically illustrating the beam spot of the light emitting from the emitting end of the optical fiber.

FIG. 22 is a sectional view taken along the plane including the optical axis near the emitting end of an optical fiber according to an eleventh embodiment of the present invention, and is a view schematically illustrating the beam spot of the light emitting from the emitting end of the optical fiber of the eleventh embodiment. An optical fiber 1K of the eleventh embodiment will be described with reference to FIG. 22.

As illustrated in FIG. 22, the optical fiber 1K of the eleventh embodiment differs from the optical fiber 1I of the ninth embodiment only in the shape of the light scattering region 5a. That is, in the optical fiber 1K of the eleventh embodiment, the aperture includes the plural cylindrical-shaped light scattering regions 5a that surround the optical axis OA of the optical fiber 1K, and the aperture is disposed close to the lens 6.

In the configuration, the light propagating in the core 4 along the direction of the arrow 10 in FIG. 22 is narrowed down while the inclination of the light with respect to the optical axis of the optical fiber 1K is restricted to the predetermined angle range by the aperture constructed by the formation of the light scattering regions 5a, and then the lens 6 is irradiated with the light. Therefore, the light with which the lens 6 is irradiated can substantially be parallelized, and a pseudo infinity projection state can be produced. Accordingly, light 14 emitting from the emitting end of the optical fiber 1K is collected to the substantially focal position (the vicinity of the position where the distance from the emitting end of the optical fiber 1K is a focal distance Lf of the lens 6.

Therefore, the beam spot in the observation plane OP (in this case, the observation plane OP is set to the plane including the substantially focal position of the lens 6) orthogonal to the optical axis OA of the optical fiber 1K includes only a small beam spot G having the high radiation intensity as illustrated in FIG. 22. The light 12' indicated by the broken line in FIG. 22 and the beam spot A express the light emitting from the emitting end and the region of the observation plane OP irradiated with the light unless the light scattering region 5a and the lens 6 are not provided in the optical fiber 1K. The light 12" indicated by the alternate long and two short dashes line in FIG. 22 and the beam spot E" express the light emitting from the emitting end and the region of the observation plane OP irradiated with the light when not the light scattering region 5a but only the lens 6 is provided in the optical fiber 1K.

As described above, the lens 6 is formed at the emitting end of the core 4, and the cylindrical-shaped light scattering region 5a is formed near the lens 6, which allows the beam control to be performed to the light emitting from the optical fiber 1K such that the desired light (in this case, the light that is collected in the substantially focal position by properly narrowing down the beam spot) is obtained. The use of the configuration can enhance the beam control property of the light emitting from the emitting end of the optical fiber 1K, and also enhance the S/N ratio.

Even if the beam control is further performed by the external optical system using the light emitting from the emitting end of the optical fiber 1K, advantageously the lens having the small effective diameter can be used and it is not necessary to separately provide the aperture. Therefore, the downsizing of the external optical system, the decrease of the number of components, and the positioning simplification because of the decrease of the number of components can be implemented.

As described above, the optical fiber in which the beam control property of the light emitting from the emitting end is enhanced by adding the aperture function and the lens function and the manufacturing method thereof can be implemented by adopting the optical fiber 1K of the eleventh embodiment and the manufacturing method thereof.

Twelfth Embodiment

Figure 23:
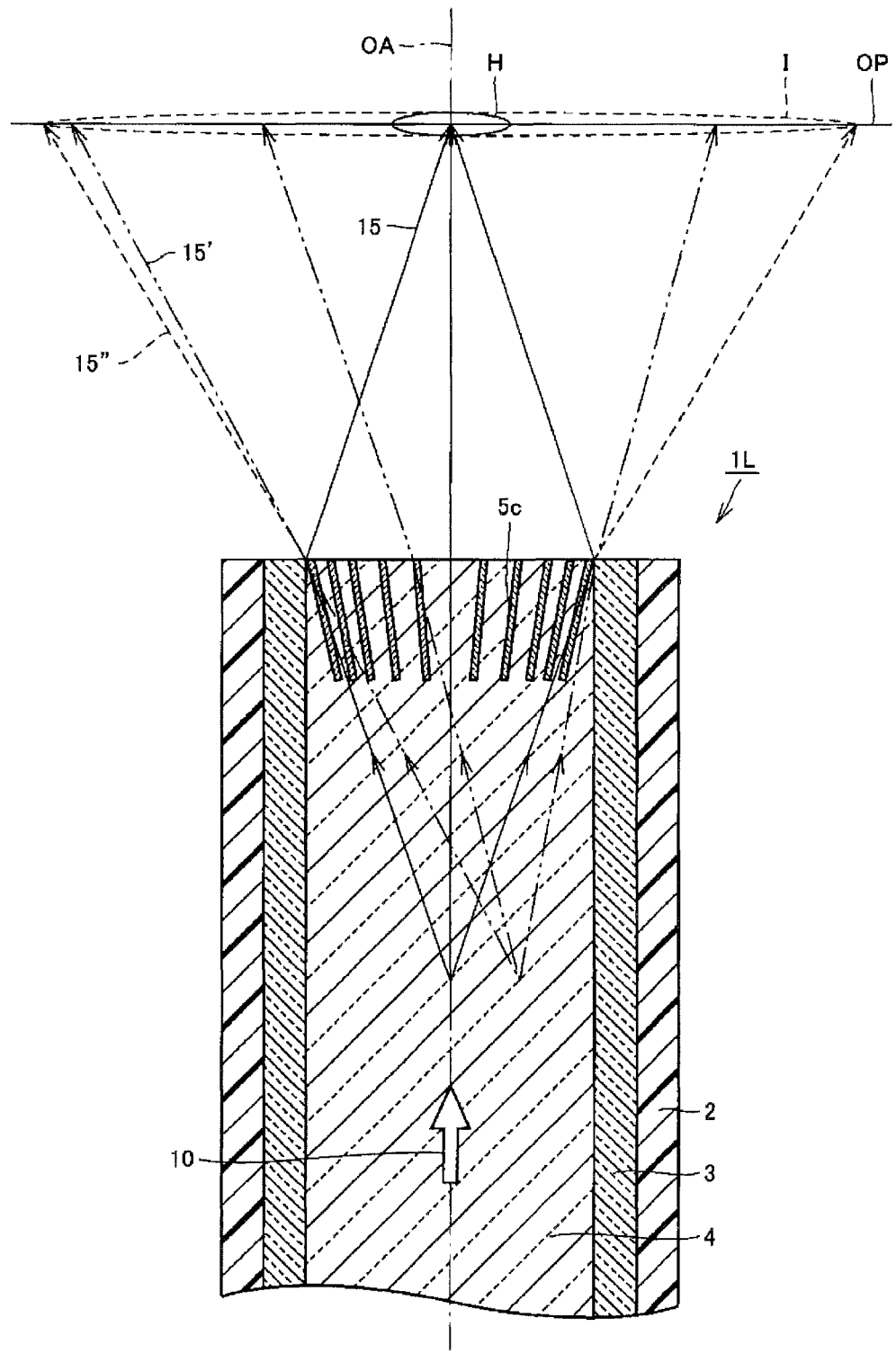
FIG. 23 is a sectional view taken along the plane including the optical axis near the emitting end of an optical fiber according to a twelfth embodiment of the present invention, and is a view schematically illustrating the beam spot of the light emitting from the emitting end of the optical fiber.

FIG. 23 is a sectional view taken along the plane including the optical axis near the emitting end of an optical fiber according to a twelfth embodiment of the present invention, and is a view schematically illustrating the beam spot of the light emitting from the emitting end of the optical fiber of the twelfth embodiment. An optical fiber 1L of the twelfth embodiment will be described with reference to FIG. 23.

As illustrated in FIG. 23, the optical fiber 1L of the twelfth embodiment includes the core 4 that is of a core wire, the clad 3 that covers the outside of the core 4, and the coating material 2 that covers the outside of the clad 3. According to one or more embodiments of the present invention, the optical fiber 1L includes the POF, and the core 4 and the clad 3 are made of the optical transparency material.

According to one or more embodiments of the present invention, the material suitable for modification processing is used as the specific material constituting the core 4 and the clad 3. For the POF, the polymer material in which the molecular structure does not include the benzene ring can be cited. For the GOF, all the glass materials can be cited. According to one or more embodiments of the present invention, the polymethylmethacrylate (PMMA) resin and the cycloolefin polymer (COP) resin can be used as the polymer material in which the molecular structure does not include the benzene ring. In the case of the use of the polymer material (such as the polycarbonate (PC) resin and the polyimide (PI) resin) in which the molecular structure includes the benzene ring, frequently the blackening is induced by the laser irradiation as described in the fifth embodiment. Even in such cases, the modification processing can be performed by optimizing the pulse energy. Therefore, the polymer material in which the molecular structure includes the benzene ring can be used.

A volume diffractive lens 5c that is of a volume diffractive optical element is provided in the core 4 located at the emitting end of the optical fiber 1L by performing the laser processing using the femtosecond laser beam described later. The emitting end of the optical fiber 1L and the vicinity of the emitting end are irradiated with the femtosecond laser beam to induce the refractive index change, thereby forming the volume diffractive lens 5c including aggregate of modification layers having a predetermined shape. The volume diffractive lens 5c has an angle dependence property with respect to the light incident to the lens, exerts the lens function only for the light incident at a predetermined principal ray angle or less, and directly transmits the light incident at an incident angle greater than the predetermined principal ray angle. Therefore, the volume diffractive lens 5c acts as a kind of aperture.

At this point, a Q value that is of an index indicating a volume property of the volume diffractive lens 5c is expressed by $Q=2\pi\lambda L/n\Lambda^2$. Where $\lambda$ is a wavelength of the light incident to the volume diffractive lens 5c, L is a modification thickness of the volume diffractive lens 5c, n is the refractive index of the core 4, and $\Lambda$ is a diffraction period of the volume diffractive lens 5c. When the Q value is greater than or equal to 10, the volume property is strong and the angle dependence property is increased. The Q value may be set to 10 or more by adjusting an outermost shell period and the modification thickness, or the modification thickness may properly be changed in each period such that the Q value becomes 10 or more.

For example, the optical fiber 1L of the twelfth embodiment is manufactured using the manufacturing apparatus 100 of the first embodiment of the present invention. Specifically, referring to FIG. 1, the laser beam 200 emitted from the laser source 101 is controlled using the optical systems 102 to 106 while the holder 107 holding the optical fiber 1 that is of the workpiece in which the aperture is not formed yet is driven by the holder driving mechanism (not illustrated), thereby irradiating the emitting end of the optical fiber 1 with the laser beam 200 from the emitting end side. Therefore, the laser processing (the modification processing) is performed to the core 4 (see FIG. 23) located at the emitting end of the optical fiber 1 to form the modification layer having the desired shape. Accordingly, the optical fiber 1L in which the aperture including the volume diffractive lens 5c is provided is manufactured as described above.

In the configuration, the radiation intensity distribution in which the radiation intensity is enhanced near the optical axis OA based on the angle dependence property of the volume diffractive lens 5c can be provided to light 15 emitting from the emitting end of the optical fiber 1L. In other words, light 15' incident to the volume diffractive lens 5c at the incident angle greater than a predetermined angle can directly be transmitted in the light propagating in the core 4 along the direction of the arrow 10 in FIG. 23.

Therefore, the beam spot in the observation plane OP orthogonal to the optical axis OA of the optical fiber 1L includes only a small beam spot H having the high radiation intensity and a large beam spot I having the low radiation intensity as illustrated in FIG. 23. The beam spot H is the region irradiated with the light 15, which emits from the emitting end of the optical fiber 1L after being refracted by the lens function of the volume diffractive lens 5c, and the beam spot I is the region irradiated with light 15", which is directly transmitted through the volume diffractive lens 5c to emit from the emitting end of the optical fiber 1L.

Even if the beam control is further performed by the external optical system using the light emitting from the emitting end of the optical fiber 1L, advantageously the lens having the small effective diameter can be used and it is not necessary to separately provide the aperture. Therefore, the downsizing of the external optical system, the decrease of the number of components, and the positioning simplification because of the decrease of the number of components can be implemented.

As described above, the optical fiber in which the beam control property of the light emitting from the emitting end is enhanced by adding the aperture function and the manufacturing method thereof can be implemented by adopting the optical fiber 1L of the twelfth embodiment and the manufacturing method thereof.

Thirteenth Embodiment

Figure 24:
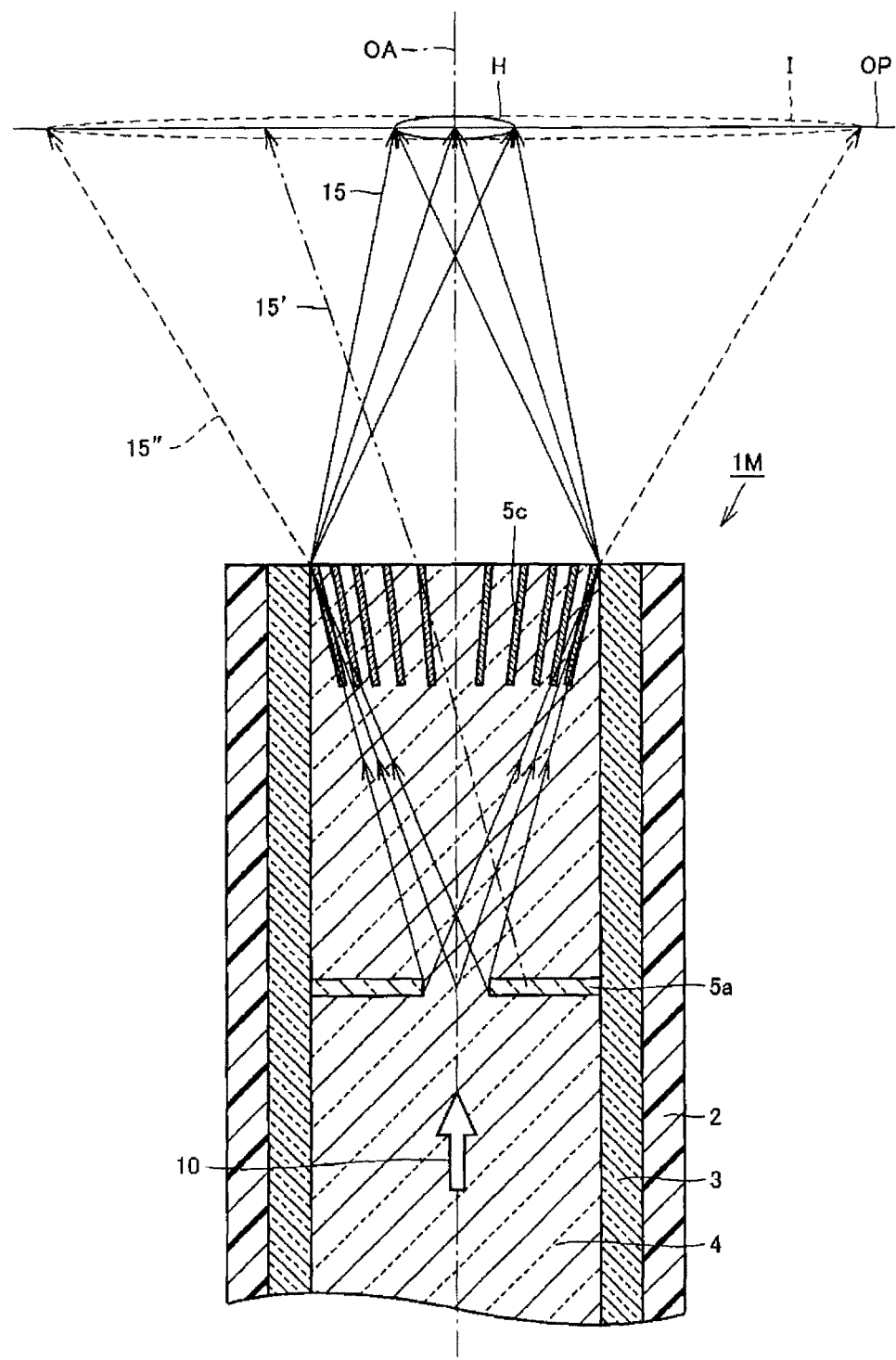
FIG. 24 is a sectional view taken along the plane including the optical axis near the emitting end of an optical fiber according to a thirteenth embodiment of the present invention, and is a view schematically illustrating the beam spot of the light emitting from the emitting end of the optical fiber.

FIG. 24 is a sectional view taken along the plane including the optical axis near the emitting end of an optical fiber according to a thirteenth embodiment of the present invention, and is a view schematically illustrating the beam spot of the light emitting from the emitting end of the optical fiber of the thirteenth embodiment. An optical fiber 1M of the thirteenth embodiment will be described with reference to FIG. 24.

As illustrated in FIG. 24, the optical fiber 1M of the thirteenth embodiment differs from the optical fiber 1L of the twelfth embodiment in that the optical fiber 1M further includes light scattering region 5a acting as the aperture in addition to the volume diffractive lens 5c acting as the aperture. As described above, both the volume diffractive lens 5c and the light scattering region 5a can be formed by the laser processing using the manufacturing apparatus 100 of the first embodiment described above.

In the configuration, not only the radiation intensity distribution in which the radiation intensity is enhanced near the optical axis OA based on the angle dependence property of the volume diffractive lens 5c can be provided to the light 15 emitting from the emitting end of the optical fiber 1M, but also the radiation intensity distribution in which the radiation intensity is enhanced near the optical axis OA can be provided by the aperture constructed by the formation of the light scattering region 5a. In other words, the light 15' incident to the volume diffractive lens 5c at the incident angle greater than the predetermined angle can directly be transmitted in the light, which propagates in the core 4 along the direction of the arrow 10 in FIG. 24 and scattered by the light scattering region 5a. Accordingly, in the optical fiber 1M of the thirteenth embodiment, the S/N ratio can further be enhanced compared with the optical fiber 1L of the twelfth embodiment.

Therefore, the beam spot in the observation plane OP orthogonal to the optical axis OA of the optical fiber 1M includes only the small beam spot H having the high radiation intensity and the large beam spot I having the extremely low radiation intensity as illustrated in FIG. 24. The beam spot H is the region irradiated with the light 15, which emits from the emitting end of the optical fiber 1M after not passing through the light scattering region 5a but being refracted by the volume diffractive lens 5c, and the beam spot I is the region irradiated with the light 15", which passes through the light scattering region 5a to weaken the radiation intensity and is directly transmitted through the volume diffractive lens 5c to emit from the emitting end of the optical fiber 1M.

Even if the beam control is further performed by the external optical system using the light emitting from the emitting end of the optical fiber 1M, advantageously the lens having the small effective diameter can be used and it is not necessary to separately provide the aperture. Therefore, the downsizing of the external optical system, the decrease of the number of components, and the positioning simplification because of the decrease of the number of components can be implemented.

As described above, the optical fiber in which the beam control property of the light emitting from the emitting end is enhanced by adding the plural aperture functions and the manufacturing method thereof can be implemented by adopting the optical fiber 1M of the thirteenth embodiment and the manufacturing method thereof.

In the first to eleventh and thirteenth embodiments of the present invention, by way of example, the light scattering region or the light absorption region is formed only in the core of the optical fiber to construct the aperture. Alternatively, the light scattering region or the light absorption region may be provided so as to reach the clad.

In the first to eleventh and thirteenth embodiments of the present invention, by way of example, the aperture is constructed by the light scattering region or light absorption region, which is formed into the disc shape or the cylindrical shape. However, the disc shape or the cylindrical shape is only the typical example. That is, the shape of the light scattering region or light absorption region is not limited to the disc shape or the cylindrical shape, but the light scattering region and the light absorption region may be formed into various shapes such as a truncated cone shape and a shape having a step as long as the light scattering region and the light absorption region exerts the function of the aperture.

In the first to eleventh and thirteenth embodiments of the present invention, the position, the size, and the thickness of the aperture constructed by forming the light scattering region or the light absorption region are typically indicated by way of example. The position, the size, and the thickness of the aperture can properly be changed based on specifications of the optical fiber or the use mode of the emitting light.

In the first to twelfth embodiments of the present invention, by way of example, the aperture is constructed by separately providing the light scattering region, the light absorption region, and the volume diffractive optical element. Alternatively, for example, the aperture may be constructed by the combination use of the light scattering region, the light absorption region, and the volume diffractive optical element like the thirteenth embodiment of the present invention.

In the ninth to eleventh embodiments of the present invention, by way of example, the lens is formed by irradiating the emitting end of the optical fiber and the vicinity of the emitting end with the femtosecond laser. As to the lens formed in the optical fiber, a convex surface or a concave surface can directly be provided at the emitting end of the optical fiber during molding of the optical fiber, and used as the lens.

The characteristic configurations described in the first to thirteenth embodiments of the present invention can obviously be combined with one another within an allowable range of the present invention.

The disclosed embodiments are illustrative only, but not restrictive. The technical scope of the present invention is defined by the claims, and the meanings equivalent to the claims and all the changes within the claims are included in the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 1, 1A to 1L optical fiber
2 coating material
3 clad
4 core
5a light scattering region
5b light absorption region
5c volume diffractive lens
6 lens
100 manufacturing apparatus
101 laser source
102 ND filter
103 attenuator
104 electromagnetic shutter
105 aperture
106 objective lens
107 holder
200 laser beam

The invention claimed is:

1. An optical fiber comprising:
an incident end on which light is incident;
an emitting end from which the light is emitted; and
an aperture provided in a core located at or near the emitting end,
wherein the aperture is formed by irradiating the core with an ultrashort pulsed laser beam having pulse widths of $10^{-15}$ seconds to $10^{-11}$ seconds,
wherein the aperture is formed by a light scattering region that is separated from the emitting end along an axis line of the core by a certain distance, and
wherein at least part of the light passing through a region other than the light scattering region of the aperture reaches the emitting end by being reflected at an interface between the core and a clad of the optical fiber on the emitting end side of the aperture.

2. The optical fiber according to claim 1,
wherein the light scattering region is formed by inducing a damage change in part of the core through the irradiation of the ultrashort pulsed laser beam.

3. The optical fiber according to claim 1,
wherein the aperture includes a light absorption region, and
wherein the light absorption region is formed by inducing blackening in part of the core through the irradiation of the ultrashort pulsed laser beam.

4. The optical fiber according to claim 1,
wherein the aperture includes an opening in a center thereof so as to surround the axis line of the core.

5. The optical fiber according to claim 4, wherein a plurality of apertures are provided along the axis line of the core while separated from each other.

6. The optical fiber according to claim 1, wherein an optical element is provided on the emitting end side of a position where the aperture is formed.

7. The optical fiber according to claim 6, wherein the optical element is formed by irradiating the core with the ultrashort pulsed laser beam having pulse widths of $10^{-15}$ seconds to $10^{-11}$ seconds.

8. The optical fiber according to claim 6, wherein the optical element is a lens.

9. The optical fiber according to claim 6, wherein the optical element is a volume diffractive optical element.

10. The optical fiber according to claim 1,
wherein the aperture includes a volume diffractive optical element, and
wherein the volume diffractive optical element is formed by inducing a refractive index change in part of the core through the irradiation of the ultrashort pulsed laser beam.

11. The optical fiber according to claim 1,
wherein beam spots of the light emitting from the emitting end on an observation plane comprises: a first beam spot that has a first diameter (b); a second beam spot that has a second diameter (c) and radiation intensity lower than the first beam spot; and a third beam spot that has a diameter (d) and radiation intensity intermediate between the first beam spot and the second beam spot.

12. The optical fiber according to claim 11, wherein a relationship among the first, the second, and the third diameter satisfies the following condition:

$$b<d\leq a\leq c$$

where a is a diameter of a beam spot on the observation plane when the scattering region is not provided in the optical fiber.

13. A method for manufacturing an optical fiber comprising:
forming the optical fiber with an incident end on which light is incident, and an emitting end from which the light is emitted; and
forming an aperture in a core located at or near the emitting end by irradiating the core with an ultrashort pulsed laser beam having pulse widths of $10^{-15}$ seconds to $10^{-11}$ seconds,
wherein the forming the aperture further comprises forming a light scattering region separated from the emitting end along an axis line of the core by a certain distance, and
wherein at least part of the light passing through a region other than the light scattering region of the aperture reaches the emitting end by being reflected at an interface between the core and a clad of the optical fiber on the emitting end side of the aperture.

14. The method according to claim 13, further comprising:
inducing a damage change in part of the core through the irradiation of the ultrashort pulsed laser beam to form the light scattering region in the aperture.

15. The method according to claim 13, further comprising:
inducing blackening in part of the core through the irradiation of the ultrashort pulsed laser beam to form a light absorption region in the aperture.

16. The method according to claim 13, wherein the aperture includes an opening in a center thereof so as to surround the axis line of the core.

17. The method according to claim 16, wherein a plurality of apertures are provided along the axis line of the core while separated from each other.

18. The method according to claim 13, further comprising:
irradiating the core with the ultrashort pulsed laser beam having pulse widths of $10^{-15}$ seconds to $10^{-11}$ seconds to form an optical element on the emitting end side of a position where the aperture is formed.

19. The method according to claim 13, further comprising:
inducing a refractive index change in part of the core through the irradiation of the ultrashort pulsed laser beam to form a volume diffractive optical element in the aperture.

20. The method according to claim 13, further comprising:
irradiating the core with the ultrashort pulsed laser beam from the emitting end side to form the aperture in the core located at or near the emitting end.

* * * * *